(12) United States Patent
Sugawara et al.

(10) Patent No.: US 6,399,938 B1
(45) Date of Patent: *Jun. 4, 2002

(54) OPTICAL DEVICE, AND IMAGING UNIT, IMAGING APPARATUS, RADIATION IMAGE SENSOR, AND FINGERPRINT IDENTIFYING APPARATUS USING THE SAME

(75) Inventors: Takeo Sugawara; Makoto Suzuki, both of Shizuoka-ken (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/463,631

(22) PCT Filed: Jul. 30, 1998

(86) PCT No.: PCT/JP98/03393

§ 371 (c)(1),
(2), (4) Date: Jan. 28, 2000

(87) PCT Pub. No.: WO99/06861

PCT Pub. Date: Feb. 11, 1999

(30) Foreign Application Priority Data

| Jul. 30, 1997 | (JP) | ................................ 9-204560 |
| Sep. 4, 1997 | (JP) | ................................ 9-239830 |
| Feb. 20, 1998 | (JP) | ................................ 10-038737 |
| Apr. 30, 1998 | (JP) | ................................ 10-121294 |
| Apr. 30, 1998 | (JP) | ................................ 10-121310 |
| May 12, 1998 | (JP) | ................................ 10-128974 |

(51) Int. Cl.[7] .............................................. G02B 6/06

(52) U.S. Cl. .................................... 250/227.2; 250/556

(58) Field of Search ............................ 250/227.2, 556, 250/557, 208.1, 566, 559.44; 356/71, 376; 382/181, 204; 385/116, 115

(56) References Cited

U.S. PATENT DOCUMENTS

| 3,043,910 A | | 7/1962 | Hicks, Jr. |
| 3,402,000 A | | 9/1968 | Crawford |
| 5,008,547 A | | 4/1991 | Molteni et al. ................. 378/99 |
| 5,426,296 A | * | 6/1995 | Shikai et al. ............. 250/227.2 |
| 6,219,483 B1 | * | 4/2001 | Sugawara et al. ........... 385/120 |

FOREIGN PATENT DOCUMENTS

| JP | 61-94005 | 5/1986 |
| JP | 02-249537 | 10/1990 |
| JP | 06-51142 | 2/1994 |
| JP | 07-174947 | 7/1995 |
| JP | 8-286048 | 11/1996 |
| JP | 08-286048 | 11/1996 |
| JP | 08-315143 | 11/1996 |

* cited by examiner

*Primary Examiner*—Que T. Le
(74) *Attorney, Agent, or Firm*—Morgan, Lewis & Bockius LLP

(57) ABSTRACT

As shown in FIG. 1, an optical device 10 comprises an input optical member 11, in which a plurality of optical fibers 14 are arranged parallel to each other and integrally formed, having an entrance surface 11a and an exit surface 11b which intersect an optical axis at an angle of 15° and at an angle of 30°, respectively; and an output optical member 12, in which a plurality of optical fibers are c:l arranged parallel to each other and integrally formed, having an entrance surface 12a and an exit surface 12b which intersect an optical axis at an angle of 7.5° and at an angle of 90°, respectively. Here, the exit surface 11b of the input optical member 11 and the entrance surface 12a of the output optical member 12 are in contact with each other, whereas the angle formed between the optical axis of the input optical member 11 and the optical axis of the output optical member 12 is an angle of 22.5° which is the difference between 30° and 7.5° mentioned above.

8 Claims, 27 Drawing Sheets

OPTICAL DEVICE, AND IMAGING UNIT, IMAGING APPARATUS, RADIATION IMAGE SENSOR, AND FINGERPRINT IDENTIFYING APPARATUS USING THE SAME

TECHNICAL FIELD

The present invention relates to an optical device; and an imaging unit, an imaging apparatus, a radiation image sensor, and a fingerprint identifying apparatus which use the same.

BACKGROUND ART

Known as an optical member for transmitting an optical image is one in which a plurality of optical fibers are arranged parallel to each other and integrally formed. Also, an optical device transmitting an optical image while enlarging or reducing it to a given magnification by using two optical members, each of which is mentioned above and has respective end faces cut obliquely and perpendicularly with respect to the optical axis, is disclosed, for example, in U.S. Pat. No. 3,402,000.

DISCLOSURE OF THE INVENTION

However, the above-mentioned optical device has been problematic in that its optical image transmission efficiency is not always sufficient. Therefore, it is an object of the present invention to provide an optical device having a favorable optical image transmission efficiency.

In order to achieve the above-mentioned object, the optical device of the present invention comprises a first optical member, composed of a plurality of optical fibers arranged parallel to each other and integrally formed, having a first entrance surface and a first exit surface which intersect an optical axis at respective angles of $\alpha_1, \beta_1$; and a second optical member, composed of a plurality of optical fibers arranged parallel to each other and integrally formed, having a second entrance surface and a second exit surface which intersect an optical axis at respective angles of $\alpha_2, \beta_2$; wherein the first exit surface and the second entrance surface are in contact with each other; wherein the above-mentioned $\beta_1$ is smaller than 90°; and wherein an angle $\theta_1$ formed between the optical axis of the first optical member and the optical axis of the second optical member is an angle of difference between $\beta_1$ and $\alpha_2$.

When $\beta_1$ is made smaller than 90°, while $\alpha_2$ is made smaller than $\beta_1$, and the angle $\theta_1$ formed between the optical axis of the first optical member and the optical axis of the second optical member is set to the angle of difference between $\beta_1$ and $\alpha_2$, the angle of refraction in the optical fibers at the joining surface between the first optical member and the second optical member can be lowered, whereby light transmission efficiency can be increased.

BRIEF DESCRIPTION OF DRAWINGS

BEST MODES FOR CARRYING OUT THE INVENTION (1) Optical Device According to Embodiment of Present Invention An optical device in accordance with an embodiment of the present invention will be explained with reference to drawings. First, the configuration of the optical device in accordance with this embodiment will be explained. As shown in FIG. 1, the optical device 10 in accordance with this embodiment comprises an input optical member 11 and an output optical member 12.

Figure 1:
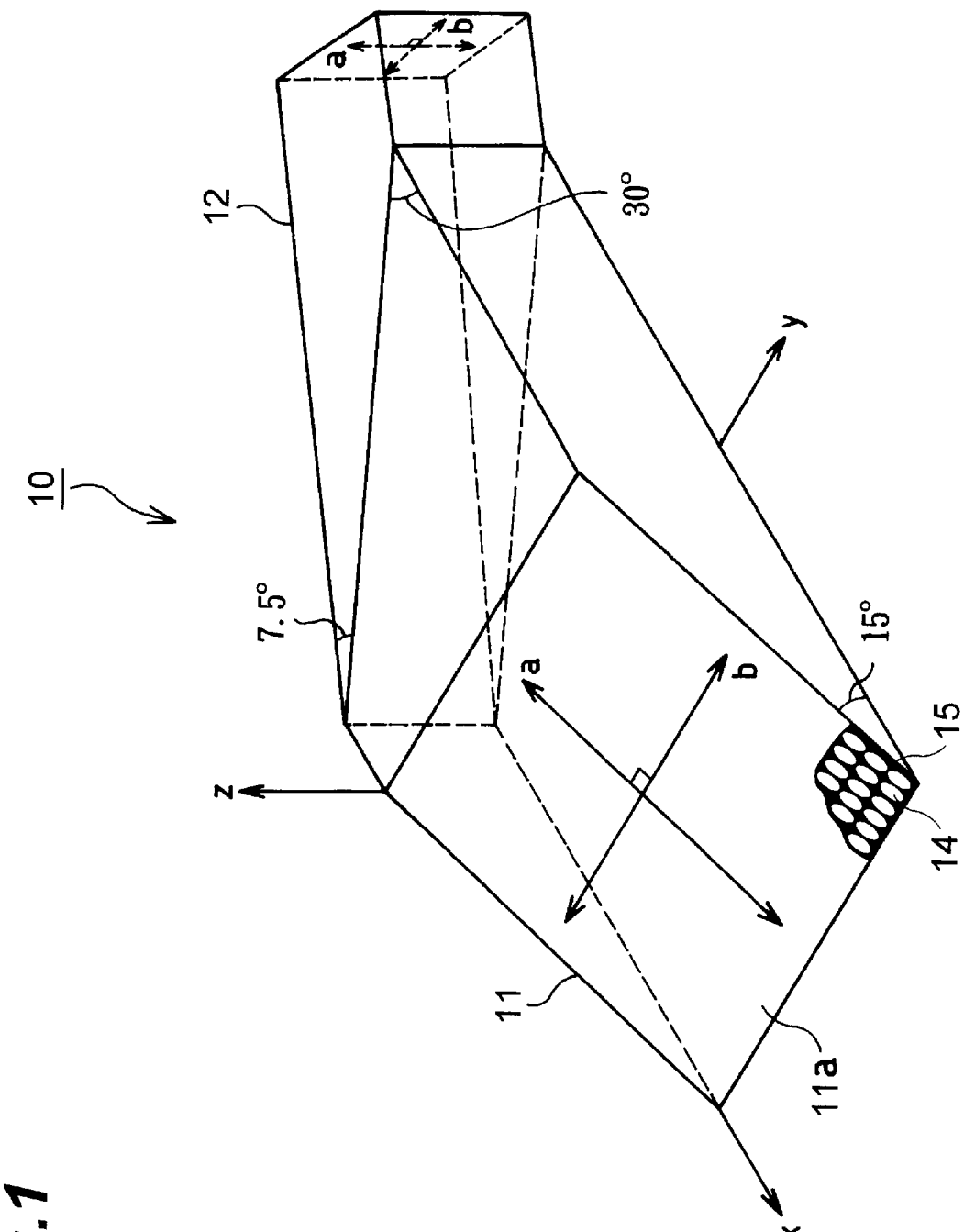
FIG. 1 is a perspective view of an optical device.

Each of the input optical member 11 and the output optical member 12 comprises a plurality of optical fibers which are arranged parallel to each other and integrally formed. In the optical fiber 14 constituting each optical member, the refractive index of its core 14a, the refractive index of its cladding 14b, and its numerical aperture are as shown in Table 1.

TABLE 1

|  | Core Refractive Index | Cladding Refractive Index | Numerical Aperture | Core Diameter |
|---|---|---|---|---|
| Input Optical Member | 1.56 | 1.52 | 0.35 | 10 μm |

TABLE 1-continued

|  | Core Refractive Index | Cladding Refractive Index | Numerical Aperture | Core Diameter |
|---|---|---|---|---|
| Output Optical Member | 1.82 | 1.495 | 1.0 | 6 μm |

Here, as can be seen from Table 1, the numerical aperture of the optical fiber 14 constituting the output optical member 12 is greater than that of the optical fiber 14 constituting the input optical member 11, whereas the core diameter of the optical fiber 14 constituting the output optical member 12 is smaller than that of the optical fiber 14 constituting the input optical member 11.

Gaps among the individual optical fibers 14 constituting the input optical member 11 and output optical member 12 are filled with a light-absorbing material 15.

The input optical member 11 has an entrance surface 11a which is obliquely cut with respect to the optical axis (the optical axis of optical fibers constituting the optical member) at an angle of 15° and an exit surface 11b which is obliquely cut with respect to the optical axis at an angle of 30°. Here, a plane (plane parallel to the xy plane in FIG. 1, hereinafter referred to as first reference plane) parallel to the optical axis of the input optical member 11 and perpendicular to the exit surface 11b of the input optical member 11 and a plane (plane parallel to the xz plane in FIG. 1) parallel to the optical axis of the input optical member 11 and the entrance surface 11a of the input optical member 11 are perpendicular to each other. Also, the angle (15°) formed between the optical axis of the input optical member 11 and the entrance surface 11a is such an angle that the light incident on the entrance surface 11a from the air does not satisfy a total reflection condition within the optical fibers 14 constituting the input optical member 11.

The output optical member 12 has, with respect to its optical axis, an entrance surface 12a which is obliquely cut at an angle of 7.5° and an exit surface 12b which is perpendicularly cut. Here, the angle formed between the optical axis of the output optical member 12 and its entrance surface 12a is smaller than that formed between the optical axis of the input optical member 11 and its exit surface 11b.

The exit surface 11b of the input optical member 11 and the entrance surface 12a of the output optical member 12 are in contact with each other. As a consequence, the optical image incident on the entrance surface 11a of the input optical member 11 is transmitted to the exit surface 12b of the output optical member 12.

Here, the above-mentioned first reference plane and a plane (hereinafter referred to as second reference plane) parallel to the optical axis of the second optical member 12 and perpendicular to the entrance surface 12a of the second optical member 12 are parallel to each other (parallel to the xy plane of FIG. 1). As a consequence, the optical axes of the optical fibers 14 constituting the individual optical members are parallel to the xy plane, whereby the light incident on each optical fiber 14 from the entrance surface 11a of the input optical member 11 advances in parallel with the xy plane.

Figure 2:
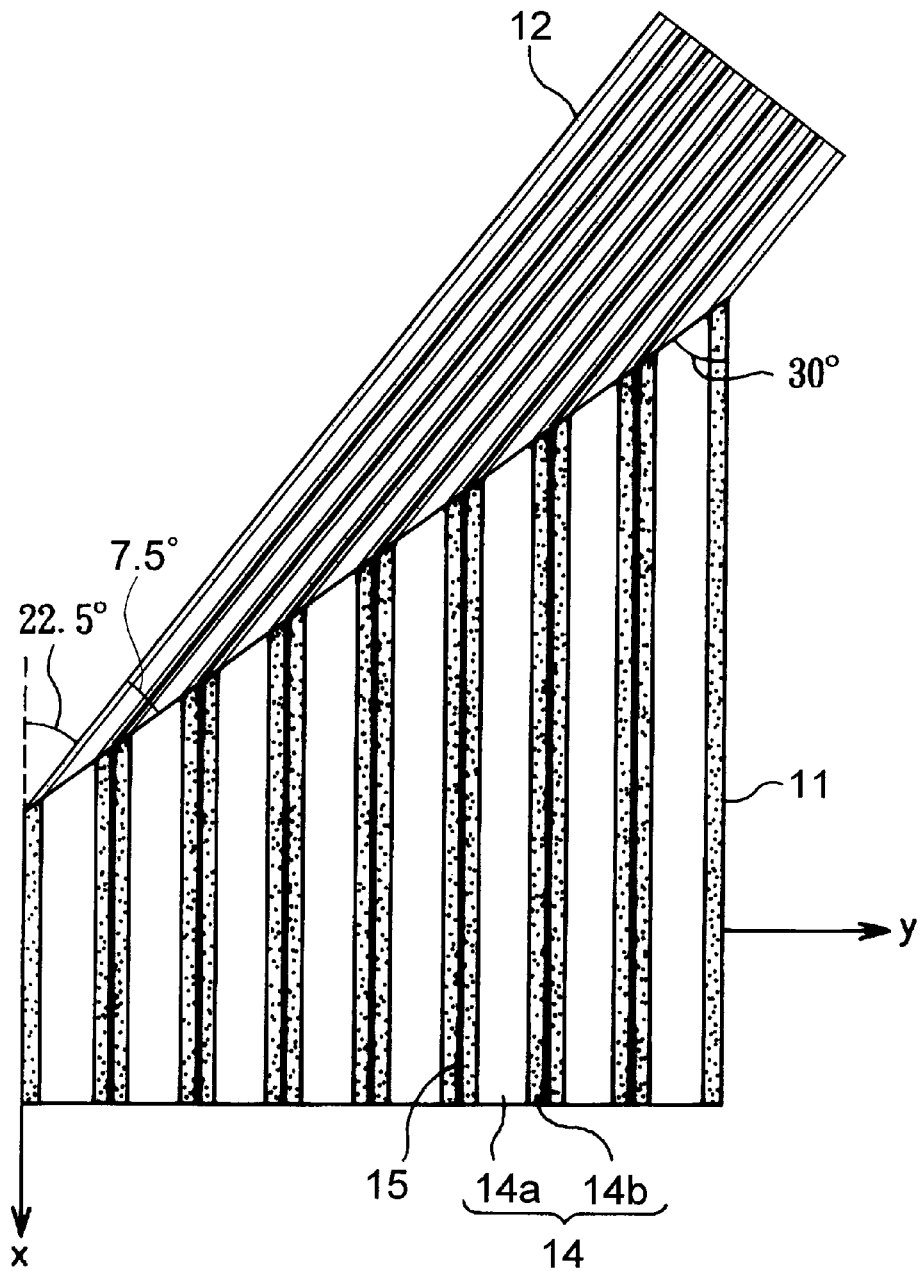
FIG. 2 is a schematic sectional view of the optical device.

FIG. 2 shows a cross section of the optical device 10 taken along a plane parallel to the xy plane. Here, FIG. 2 is a schematic sectional view showing the relationship between the respective optical axes of the optical members, whereas each optical member is a bundle of several thousands of optical fibers in practice. Here, the angle $\theta_1$ formed between the optical axis of the first optical member 11 and the optical axis of the second optical member 12 is an angle of 22.5° which is the difference between the angle of 30° formed between the optical axis of the input optical member 11 and the exit surface 11b and the angle of 7.5° formed between the optical axis of the output optical member 12 and the entrance surface 12a.

Figure 3:
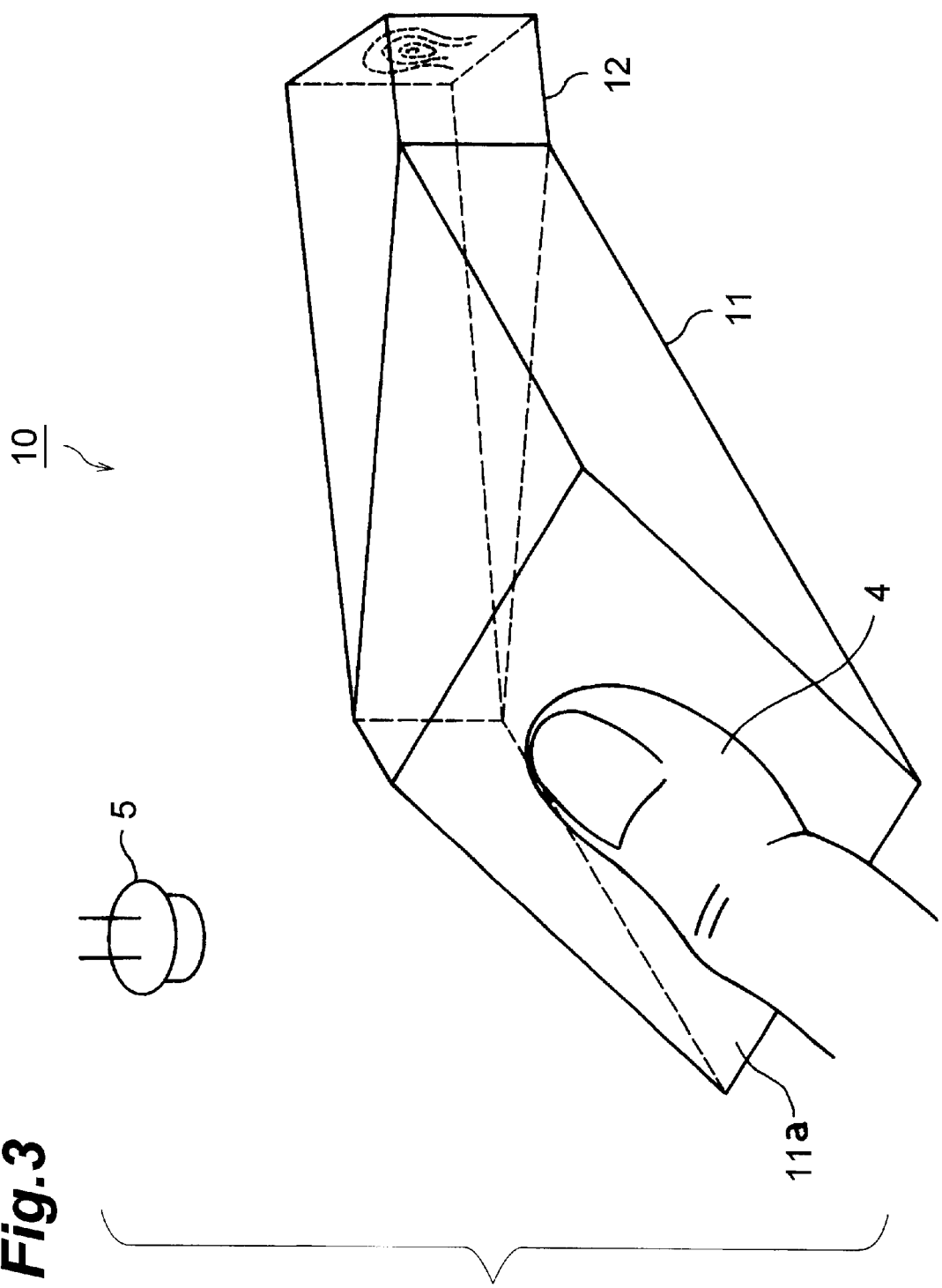
FIG. 3 is a view for explaining the use of the optical device.

For example, when the optical device 10 is used for reducing and capturing a fingerprint image, it is arranged as shown in FIG. 3. Namely, a finger 4 is brought into contact with the entrance surface 11a of the input optical member 11, and light is projected from an LED 5 or the like. The angle formed between the optical axis of the input optical member 11 and the entrance surface 11a is set to 15° such that the incident light from the air does not satisfy a total reflection condition within the optical fibers 14 constituting the input optical member 11. As a consequence, the light incident on the input optical member 11 from the air attenuates and disappears within the input optical member 11, whereas only the light incident on the input optical member 11 by way of the contact portion (protrusions of the fingerprint) of the finger 4 propagates through the input optical member 11 and output optical member 12. Hence, when the optical image formed on the exit surface 12b of the output optical member 12 is captured with a CCD camera or the like, a reduced fingerprint image can be obtained.

Figure 4:
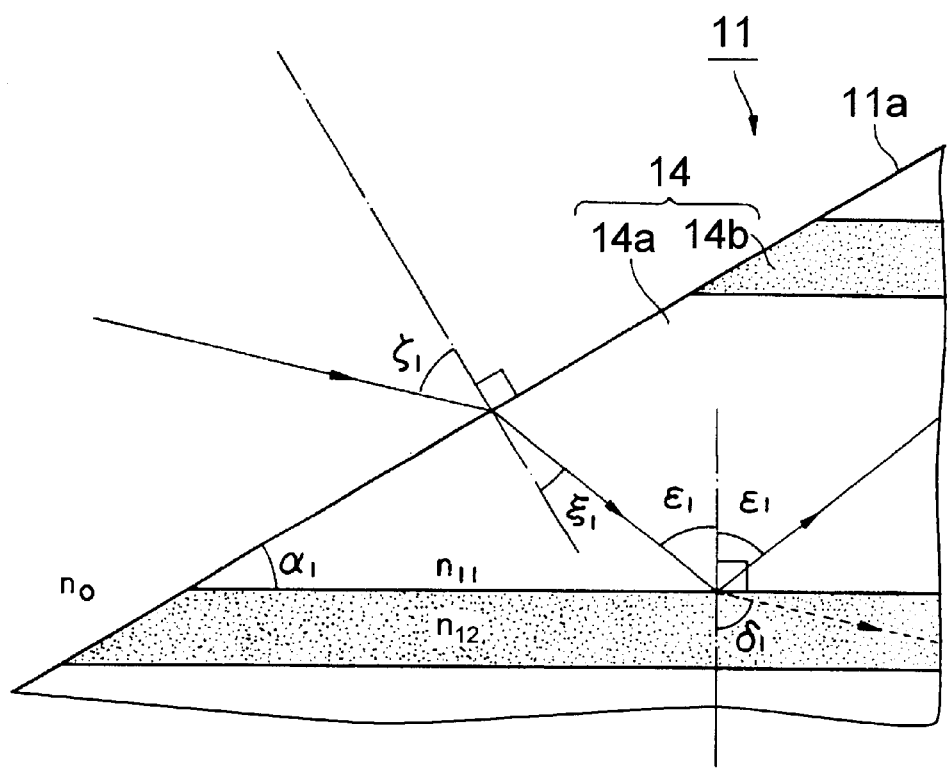
FIG. 4 is an explanatory view showing light propagation within the optical device.

Operations of the optical device in accordance with this embodiment will now be explained. First, a case where the light incident on the entrance surface 11a of the input optical member 11 from the air propagates while being refracted and reflected by the core/cladding interface of the optical fibers 14 constituting the input optical member 11 as shown in FIG. 4 will be considered. Here, let $n_0$ be the refractive index of the air, and $n_{11}$ and $n_{12}$ be the respective refractive indices of the core 14a and cladding 14b of the optical fibers 14 constituting the input optical member 11. Also, let $\alpha_1$ be the angle formed between the optical axis of the input optical member 11 and its entrance surface 11a $\zeta_1$ be the angle of incidence of light incident on the entrance surface 11a of the input optical member 11 from the air, $\xi_1$ be the angle of refraction thereof, $\epsilon_1$ be the angle of incidence of light incident on the cladding 14b of the input optical member 11 from its core 14a, and $\delta_1$ be the angle of refraction thereof.

The relationship between $\zeta_1$ and $\xi_1$ is expressed by $$n_0 \sin \zeta_1 = n_{11} \sin \xi_1 \quad (1)$$

from the law of refraction. As a consequence, the incident light from all directions ($0° \leq \zeta_1 \leq 90°$) in the air enters the input optical member 11 from its entrance surface 11a within the range of $\xi_1$ satisfying $$0 \leq \sin \xi_1 \leq n_0/n_{11}. \quad (2)$$

On the other hand, $\alpha_1$, and $\xi_1$, and $\epsilon_1$ have a relationship of $$\alpha_1 + (90° + \xi_1) + (90° - \epsilon_1) = 180° \quad (3)$$

as seen from FIG. 4.

Therefore, if expression (3) is used for determining $\alpha_1$ so as not to satisfy the total reflection condition in the core/cladding interface $$\sin \epsilon_1 > n_{12}/n_{11} \quad (4)$$

in all $\epsilon_1$ satisfying expression (2), then the light incident on the input optical member 11 from the air will attenuate and disappear within the input optical member 11, and will not propagate therethrough.

On the other hand, a part of the light incident on the input optical member 11 from the contact portion of a sample such as a finger, which is a material having a refractive index higher than that of the air, with respect to the entrance surface 11a satisfies the total reflection condition, thereby propagating through the input optical member 11.

In the optical device 10 in accordance with this embodiment, since $n_{11}=1.56$, and $n_{12}=1.52$, the light incident on the entrance surface 11a of the input optical member 11 from the air can be attenuated and extinguished within the input optical member 11 if $\alpha_1$ is set to 37.1° or less (assuming that the refractive index of air $n_0=1.00$). Here, in the optical device 10 in accordance with this embodiment, $\alpha_1$ is set to 15° in view of the efficiency of reduction.

Here, since the entrance surface 11a of the input optical member 11 is perpendicular to the xz plane of FIG. 1 while forming an angle of 15° with the optical axis of the input optical member 11, and the exit surface 11b of the input optical member 11 is perpendicular to the xy plane while forming an angle of 30° with the optical axis of the input optical member 11, the input optical member 11 acts to reduce the optical image incident on the entrance surface 11a to 1/3.86 (sin 15°) in size in the a-axis direction of FIG. 1, enlarge it to 2 times (1/sin 30°) in the b-axis direction, and output the resulting image.

Figure 5:
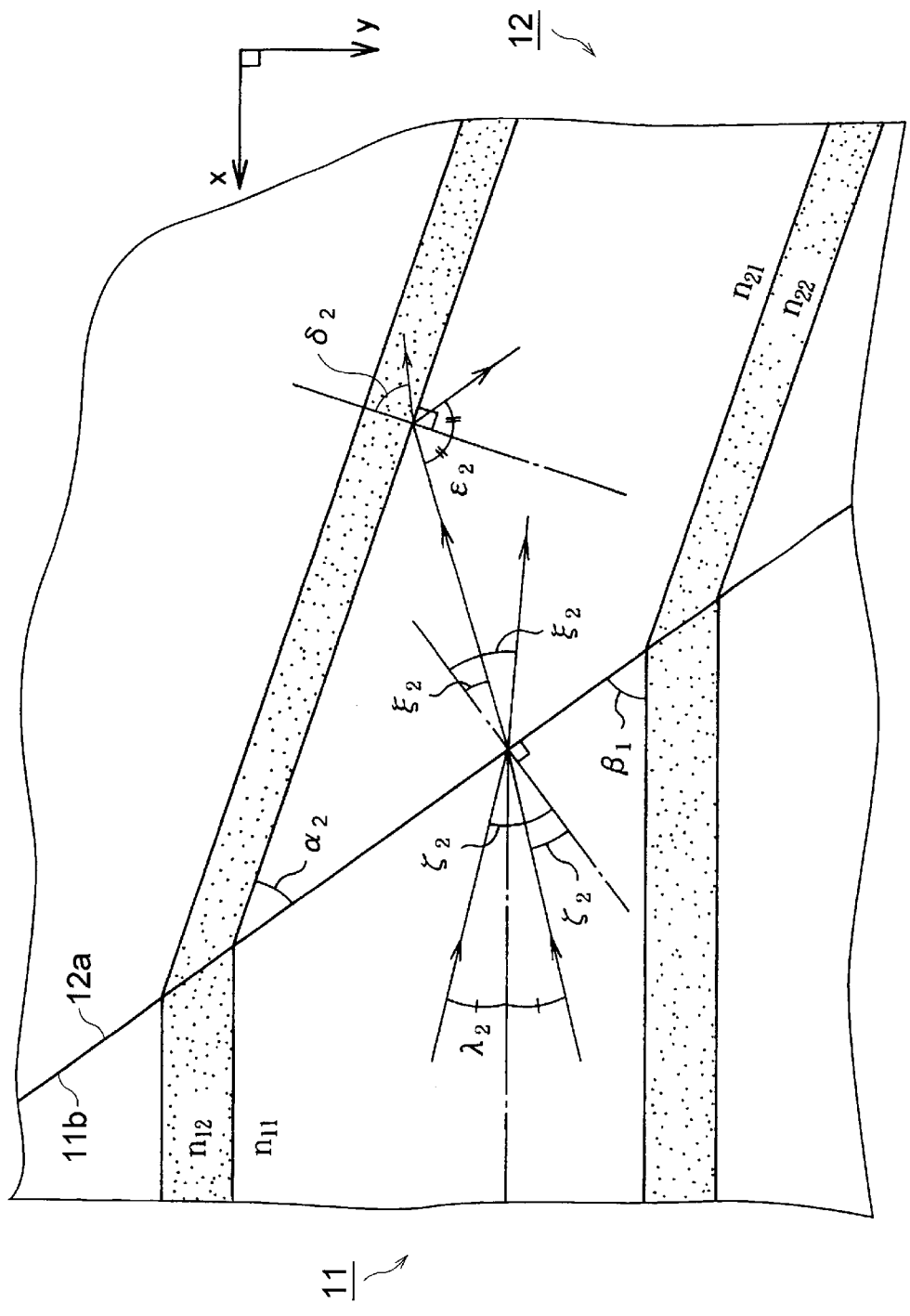
FIG. 5 is an explanatory view showing light propagation within the optical device.

A case where light is incident on the entrance surface 12a of the output optical member 12 from the exit surface 11b of the input optical member 11 and propagates while being refracted and reflected by the core/cladding interface of the optical fibers 14 constituting the output optical member 12 as shown in FIG. 5 will now be considered. Here, let $n_{21}$ and $n_{22}$ be the respective refractive indices of the core 14a and cladding 14b of the optical fibers 14 constituting the output optical member 12. Also, let $\alpha_2$ be the angle formed between the optical axis of the output optical member 12 and its entrance surface 12a, $\lambda_2$ be the advancing angle of light advancing through the input optical member 11 with respect to the optical axis of the input optical member 11, $\zeta_2$ be the angle of incidence of light incident on the entrance surface 12a of the output optical member 12 from the exit surface 11b of the input optical member 11, $\xi_2$ be the angle of refraction thereof, $\epsilon_2$ be the angle of incidence of light incident on the cladding 14b of the output optical member 12 from its core 14a, and $\delta_2$ be the angle of refraction thereof.

According to the total reflection condition of the input optical member 11, $\lambda_2$ lies within the range satisfying $$\sin(90°-\lambda_2) > n_{12}/n_{11} \tag{5}$$

Since the exit surface 11b of the input optical member 11 intersects the optical axis of the input optical member 11 at an angle of $\beta_1$, the relationship between $\lambda_2$ and $\zeta_2$ is $$\zeta_2 = 90° - \beta_1 \pm \lambda_2. \tag{6}$$

Also, the relationship between $\zeta_2$ and $\xi_2$ is expressed by $$n_{11} \sin \zeta_2 = n_{21} \sin \xi_2 \tag{7}$$

from the law of refraction.

On the other hand, $\alpha_2$, $\xi_2$, and $\epsilon_2$ have a relationship of $$\alpha_1 + (90°+\xi_2) + (90°-\epsilon_2) = 180° \tag{8}$$

as seen from FIG. 5.

Therefore, in view of expression (5), by using expression (8), if at least a part of $\epsilon_2$ satisfying expression (7) satisfies the total reflection condition in the core/cladding interface $$\sin \epsilon_2 > n_{22}/n_{21}, \tag{9}$$

then at least a part of the light incident on the entrance surface 12a of the output optical member 12 from the exit surface 11b of the input optical member 11 will be transmitted through the optical fibers 14 constituting the output optical member 12 while satisfying the total reflection condition.

In the optical device 10 in accordance with this embodiment, since $n_{11}=1.56$, $n_{12}=1.52$, $n_{21}=1.82$, and $n_{22}=1.495$, the light propagating through the optical fibers constituting the input optical member 11 has an advancing angle $\lambda_2$ of 13° or less with respect to the optical axis of the input optical member 11. Also, for generating total reflection at the core/cladding interface of the optical fiber 14 constituting the output optical member 12, it is necessary that the light be incident at an incident angle $\epsilon_2$ of 55° or greater with respect to the cladding 14b. Therefore, if $\beta_1=30°$, and $\alpha_2=7.5°$, then about 46.6% of the light incident on the entrance surface 12a of the output optical member 12 from the exit surface 11b of the input optical member 11 in terms of the light receiving angle ratio (incident angle range satisfying the total reflection condition/whole incident angle×100) is transmitted through the optical fibers 14 constituting the output optical member 12, while satisfying the total reflection condition.

Here, since the entrance surface 12a of the output optical member 12 is perpendicular to the xy plane of FIG. 1 while forming an angle of 7.5° with the optical axis of the output optical member 12, and the exit surface 12b of the output optical member 12 is perpendicular to the optical axis of the output optical member 12, the output optical member 12 reduces the optical image incident on the entrance surface 12a to 1/7.66 (sin 7.5°) in size in the b-axis direction of FIG. 1. Therefore, the optical image inputted to the entrance surface 11a of the input optical member 11 and outputted from the exit surface 12b of the output optical member 12 is reduced to 1/3.86 in the a-axis direction of FIG. 1 and to 1/1.383 in the b-axis direction, thus becoming a substantially similarly reduced optical image.

Effects of the optical device in accordance with this embodiment will now be explained. In the optical device 10 in accordance with this embodiment, since $\beta_1$ is made smaller than 90°, and the angle $\theta_1$ formed between the optical axis of the input optical member 11 and the optical axis of the output optical member 12 is set to the angle of difference between $\beta_1$ and $\alpha_2$, the angle of refraction in the light path (optical fiber) at the junction between the individual optical members is reduced. Hence, about 46.6% of the light incident on the entrance surface 12a of the output optical member 12 from the exit surface 11b of the input optical member 11 satisfies the total reflection condition within the output optical member 12.

As a result, the optical image incident on the entrance surface 11a of the input optical member 11 can be transmitted to the exit surface 12b of the output optical member 12 while satisfying the total reflection condition within each optical member, whereby the transmission efficiency becomes quite high.

Also, since optical images can be transmitted without using a scattering surface or the like at the joining surface of the optical members, output images with a very high resolution can be obtained, whereas fine processing such as that of the scattering surface becomes unnecessary.

In the optical device 10 in accordance with the above-mentioned embodiment, the angle $\alpha_1$ formed between the optical axis of the input optical member 11 and its entrance surface 11a, the angle $\beta_1$ formed between the optical axis of the input optical member 11 and its exit surface 11b, the angle $\alpha_2$ formed between the optical axis of the output optical member 12 and its entrance surface 12a, the numerical aperture NA1 of the optical fiber 14 constituting the input optical member 11, and the numerical aperture NA2 of the optical fiber 14 constituting the output optical member 12 are not restricted to the values mentioned above but may be modified in various manners.

Table 2 indicates changes in demagnification m (size of output pattern/size of input pattern) of an output image when the angle $\beta_1$ formed between the optical axis of the input optical member 11 and its exit surface 11b is varied while the numerical aperture NA1 of the optical fiber 14 constituting the input optical member 11 and the numerical aperture NA2 of the optical fiber 14 constituting the output optical member 12 are set to their respective values listed in the above-mentioned Table 1 (NA1=0.35, NA2=1.0) in the optical device 10 in accordance with the above-mentioned embodiment.

Here, the angle $\alpha_2$ formed between the optical axis of the output optical member 12 and its entrance surface 12a is determined such that the light receiving angle ratio of the light incident on the output optical member 12 from the input optical member 11 is 50%. On the other hand, the angle $\alpha_1$ formed between the optical axis of the input optical member 11 and its entrance surface 11a is determined such that the output pattern is similarly reduced with respect to the input pattern, i.e., the demagnification in the a-axis direction and that in the b-axis direction substantially equal each other.

For comparison, the demagnification m is similarly indicated for the case where the angle $\beta_1$ formed between the optical axis of the input optical member 11 and its exit surface 11b is 90°.

TABLE 2

| $\beta_1$ | $\alpha_2$ | $\alpha_1$ | m |
|---|---|---|---|
| 90° | 55° | 55° | 1:1.22 |
| 75° | 42.18° | 44.04° | 1:1.44 |
| 60° | 29.62° | 34.80° | 1:1.75 |
| 45° | 17.69° | 25.45° | 1:2.33 |
| 30° | 7.07° | 14.25° | 1:4.06 |
| 23° | 2.91° | 7.47° | 1:7.7 |

Further, Table 4 indicates changes in demagnification m of input/output pattern when the angle $\beta_1$ formed between the optical axis of the input optical member 11 and its exit surface 11b is varied while the numerical aperture NA1 of the optical fiber 14 constituting the input optical member 11 and the numerical aperture NA2 of the optical fiber 14 constituting the output optical member 12 are set to their respective values listed in the following Table 3 (NA1=0.55, NA2=1.0) in the optical device 10 in accordance with the above-mentioned embodiment.

TABLE 3

|  | Core Refractive Index | Cladding Refractive Index | Numerical Aperture | Core Diameter |
|---|---|---|---|---|
| Input Optical Member | 1.62 | 1.52 | 0.55 | 10 μm |
| Output Optical Member | 1.82 | 1.495 | 1.0 | 6 μm |

TABLE 4

| $\beta_1$ | $\alpha_2$ | $\alpha_1$ | m |
|---|---|---|---|
| 90° | 55° | 55° | 1:1.22 |
| 75° | 41.68° | 43.51° | 1:1.45 |
| 60° | 28.57° | 33.52° | 1:1.81 |
| 45° | 15.99° | 22.93° | 1:2.57 |
| 30° | 4.57° | 9.17° | 1:6.28 |

Figure 6:
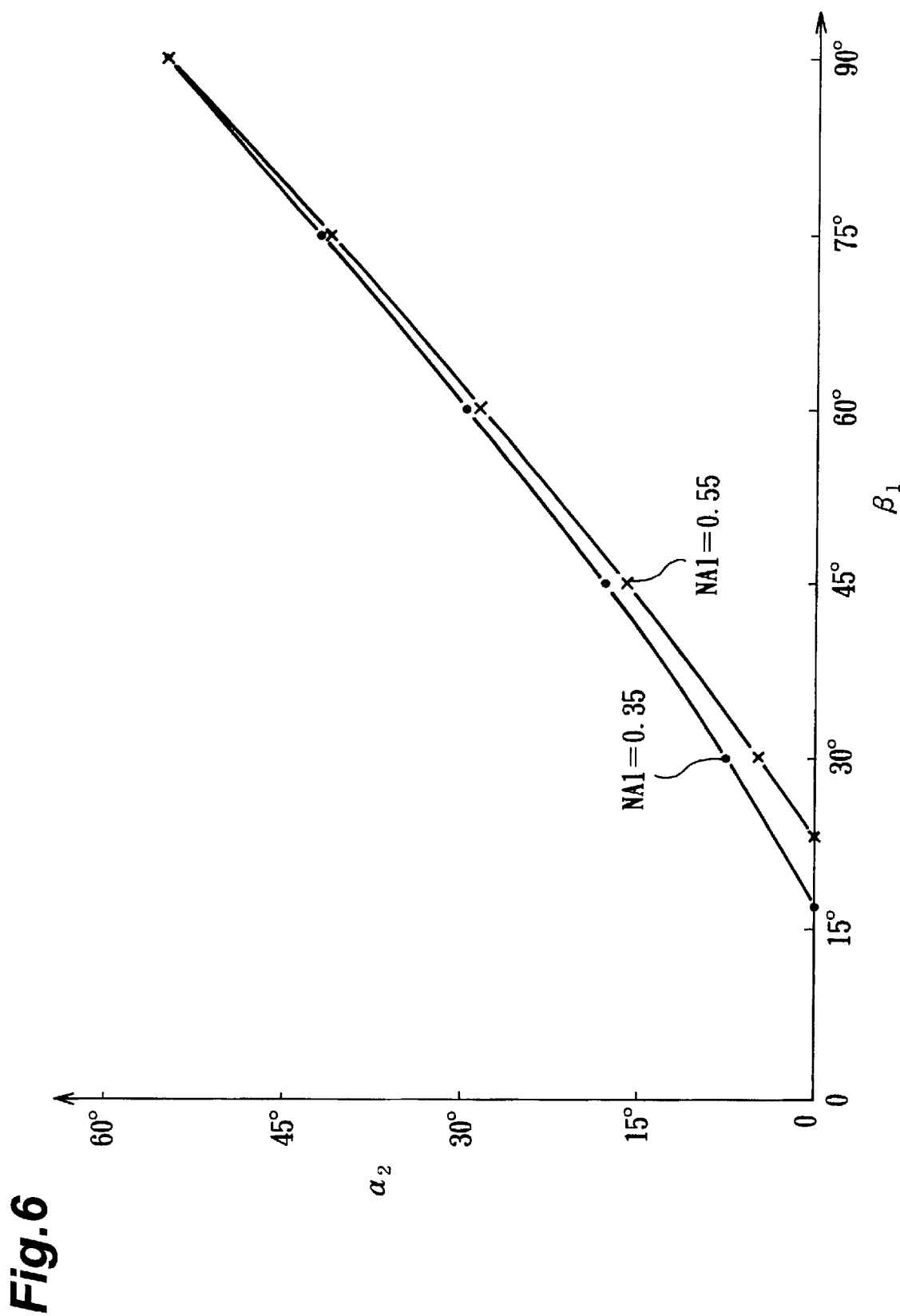
FIG. 6 is a chart showing relationships between $\beta_1$ and $\alpha_2$.
Figure 7:
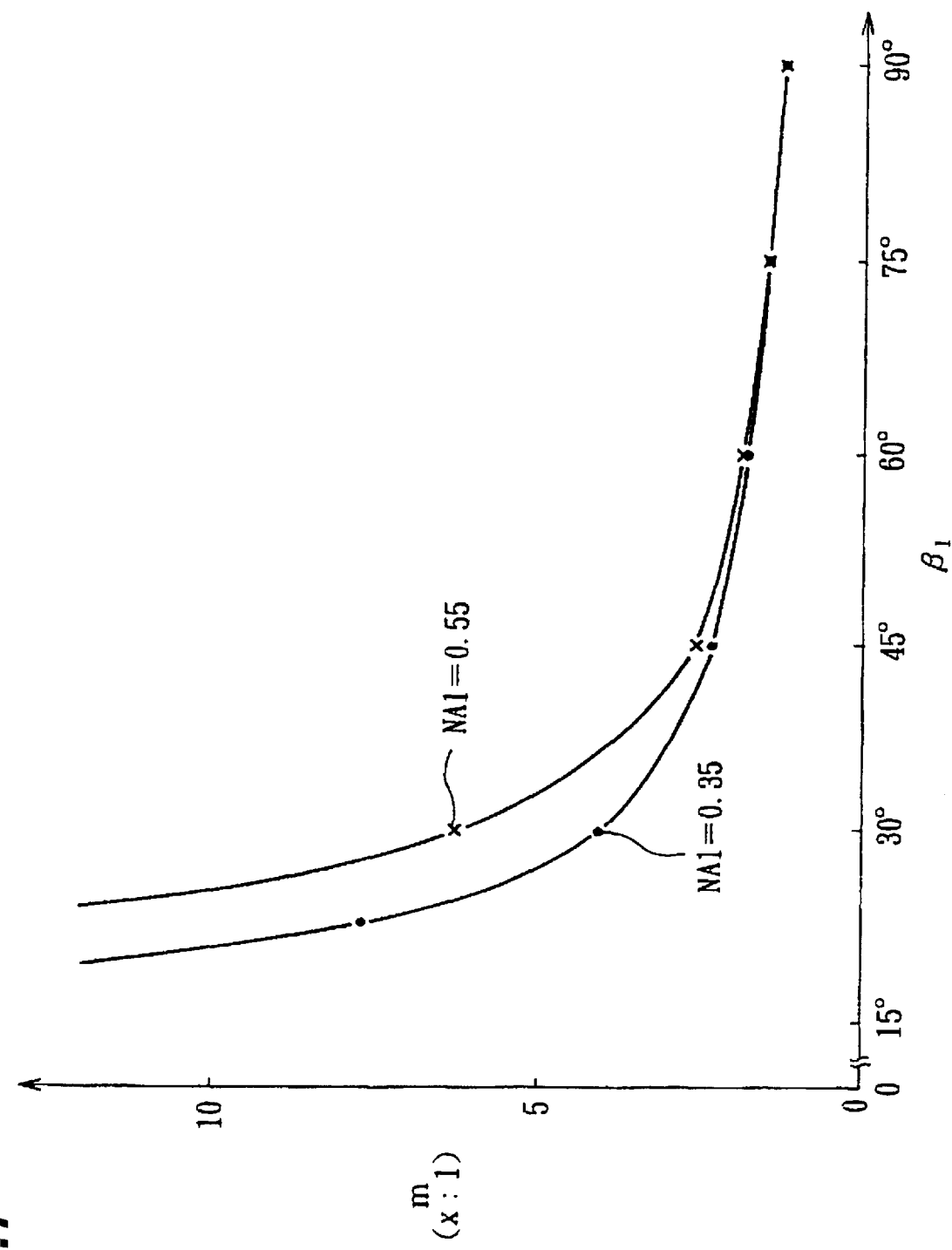
FIG. 7 is a chart showing relationships between $\beta_1$ and m.

On the other hand, FIG. 6 shows the respective relationships between $\beta_1$ and $\alpha_2$ in the above-mentioned Tables 2 and 4, whereas FIG. 7 shows the respective relationships between $\beta_1$ and m in the above-mentioned Tables 2 and 4.

As can be seen from Tables 2 and 4 and FIGS. 6 and 7, in the case where $\beta_1$ is smaller than 90° as compared with the case where $\beta_1$ is 90°, $\alpha_2$ can be made smaller while the transmission efficiency is held constant, whereby the demagnification can be enhanced.

Further, in the case where the numerical aperture NA1 of the optical fiber 14 constituting the input optical member 11 is greater, $\alpha_2$ can be made smaller with respect to the same $\beta_1$, whereby the demagnification can be enhanced.

Though the optical axis of the output optical member 12 and the exit surface 12b thereof are perpendicular to each other in the optical device 10 in accordance with this embodiment, they may not be perpendicular to each other.

When the plane parallel to the optical axis of the output optical member 12 and perpendicular to the exit surface 12b of the output optical member 12 is made parallel or identical to the above-mentioned second reference plane, then the optical image incident on the entrance surface 12a of the output optical member 12 can be outputted from the exit surface 12b while being reduced only in a specific direction (b-axis direction of FIG. 1).

Figure 8:
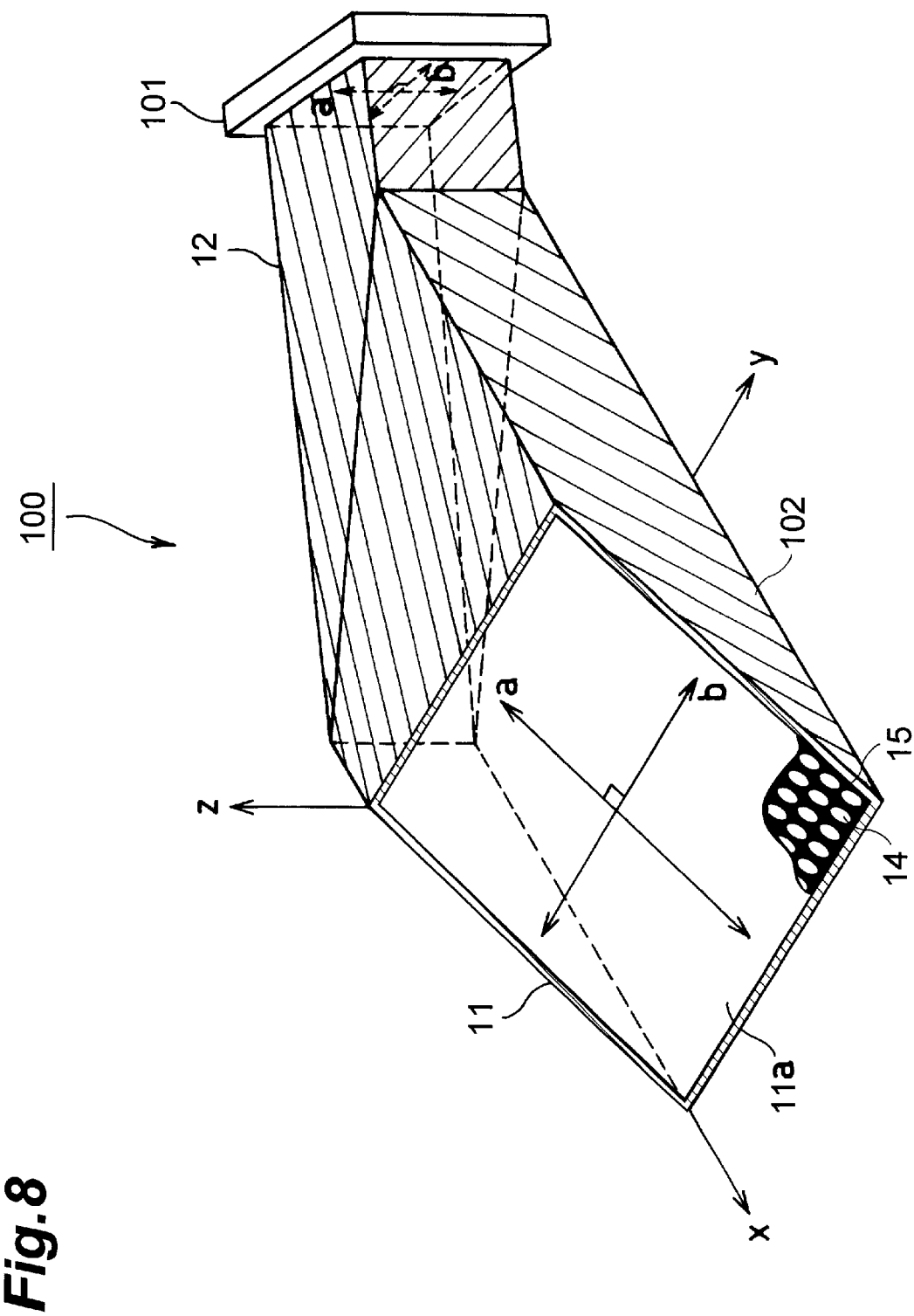
FIG. 8 is a perspective view of an imaging unit.

(2) Imaging Unit Using Optical Device According to Embodiment of Present Invention An imaging unit using the optical device in accordance with the above-mentioned embodiment will now be explained with reference to a drawing. First, the configuration of the imaging unit using the optical device in accordance with the above-mentioned embodiment will be explained. The imaging unit 100 comprises, as shown in FIG. 8, the above-mentioned optical device 10 (i.e., optical device 10 comprising the input optical member 11 and the output optical member 12) and a CCD 101 disposed in contact with the exit surface 12b of the output optical member 12. Here, more specifically, the exit surface 12b of the output optical member 12 is in contact with the light-receiving surface of the CCD 101.

Further, all the surfaces (hereinafter referred to as side faces) of the input optical member 11 excluding the entrance surface 11a and exit surface 11b and the side faces of the output optical member 12 are provided with a light-shielding material 102 (see the hatched areas of FIG. 8).

The side faces of each optical member can be provided with the light-shielding material 102 by a method in which the entrance surface and exit surface of each optical member are masked and then a light-shielding agent (e.g., black paint) is sprayed on the side faces, a method in which the light-shielding agent is applied to the side faces with a brush, a method in which the optical member is immersed into a vessel filled with the light-shielding agent, or the like.

Operations and effects of the imaging unit using the optical device in accordance with the above-mentioned embodiment will now be explained. Since the imaging unit 100 comprises the above-mentioned optical device 10, the optical image incident on the entrance surface 11a of the input optical member 11 can efficiently be transmitted to the exit surface 12b of the output optical member 12.

Also, since the CCD 101 is disposed in contact with the exit surface 12b of the output optical member 12, the imaging unit 100 can capture the optical image transmitted to the exit surface 12b of the output optical member 12.

Further, in the imaging unit 100, since the light-shielding material 102 is disposed on the side faces of each optical member, light is prevented from entering each optical member from the side faces thereof, whereby the S/N ratio can be enhanced.

As a result, the imaging unit 100 can capture a clear, high-contrast, high-resolution, reduced image.

Figure 9:
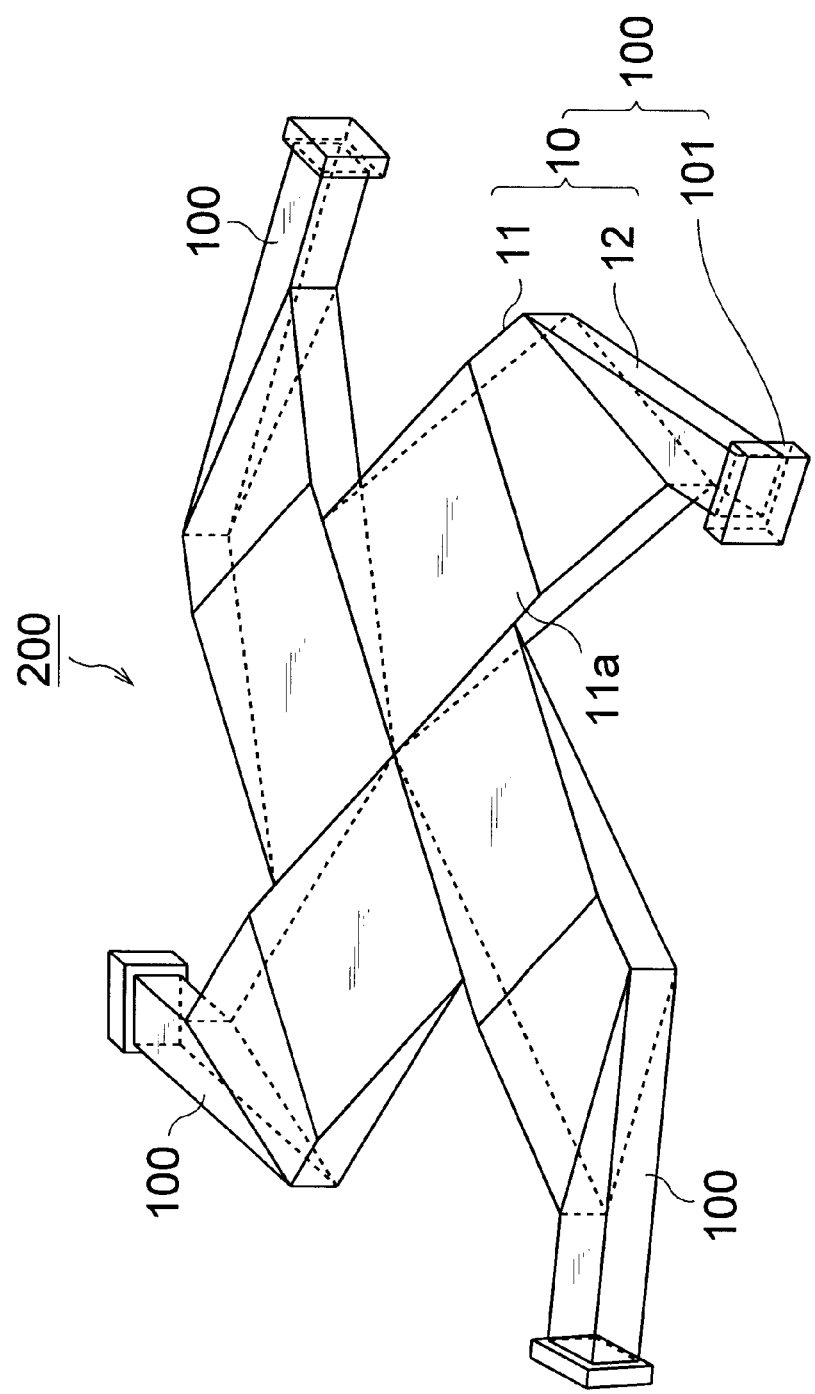
FIG. 9 is a perspective view of an imaging apparatus.

(3) Imaging Apparatus Using Optical Device According to Embodiment of Present Invention An imaging apparatus using the optical device in accordance with the above-mentioned embodiment will now be explained with reference to a drawing. First, the configuration of the imaging apparatus using the optical device in accordance with the above-mentioned embodiment will be explained. As shown in FIG. 9, the imaging apparatus 200 has four sets of imaging units 100 mentioned above, and is configured such that the individual imaging units 100 are arranged such that the respective entrance surfaces la of the input optical members 11 constituting the individual imaging units 100 align on substantially the same plane.

Operations and effects of the imaging apparatus using the optical device in accordance with the above-mentioned embodiment will now be explained. Since the imaging apparatus 200 comprises the above-mentioned imaging unit 100, it can capture a clear, high-contrast, high-resolution, reduced image.

Further, in the imaging apparatus 200, the four sets of imaging units 100 are arranged such that the respective entrance surfaces 11a of the input optical members 11 constituting the individual imaging units 100 align on substantially the same plane. Hence, the light-receiving surface capable of inputting optical images can be enlarged. Here, though a reduced image is divided into the individual CCDs 101 so as to be captured thereby, the whole reduced image can be reproduced when the images captured by the individual CCDs 101 are combined by an image processing unit or the like.

Also, since the imaging apparatus 200 has a very simple configuration comprising a plurality of simple optical members and CCDs, it can be made quite inexpensively as compared with tapered fiber optical members and the like which are similarly made in order to enlarge the light-receiving surface.

Further, in the imaging apparatus 200, since a plurality of imaging units each combining a plurality of optical members together are arranged, the respective CCDs 101 in the individual imaging units 100 would not be placed at positions adjoining each other. As a result, there would be no restriction in terms of arrangement caused by the fact that the outer shape of the CCD 101 is greater than its effective light-receiving surface.

Figure 10:
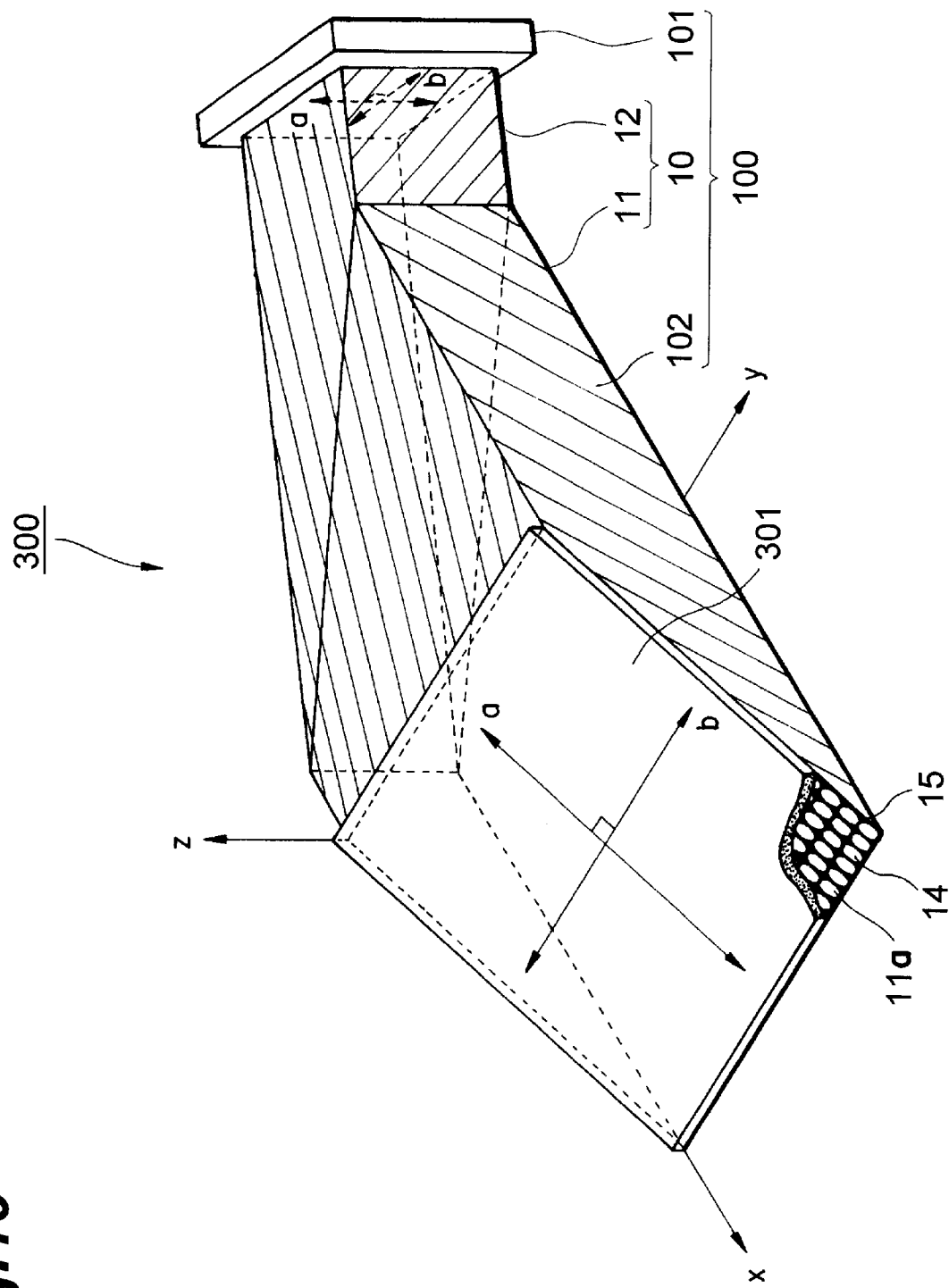
FIG. 10 is a perspective view of a radiation image sensor.

(4) Radiation Image Sensor Using Optical Device According to Embodiment of Present invention A radiation image sensor using the optical device in accordance with the above-mentioned embodiment will now be explained with reference to drawings. First, the configuration of the radiation image sensor using the optical device in accordance with the above-mentioned embodiment will be explained. The radiation image sensor 300 comprises, as shown in FIG. 10, the above-mentioned imaging unit 100 (i.e., imaging unit 100 comprising the input optical member 11, the output optical member 12, the CCD 101, and the light-shielding material 102), and a phosphor 301 which is disposed on the entrance surface 11a of the input optical member 11 constituting the above-mentioned imaging unit 100 and is adapted to emit light upon incidence of a radiation. As the material of the phosphor 301, $Gd_2O_2S$:Tb or the like may be used, for example.

Figure 11:
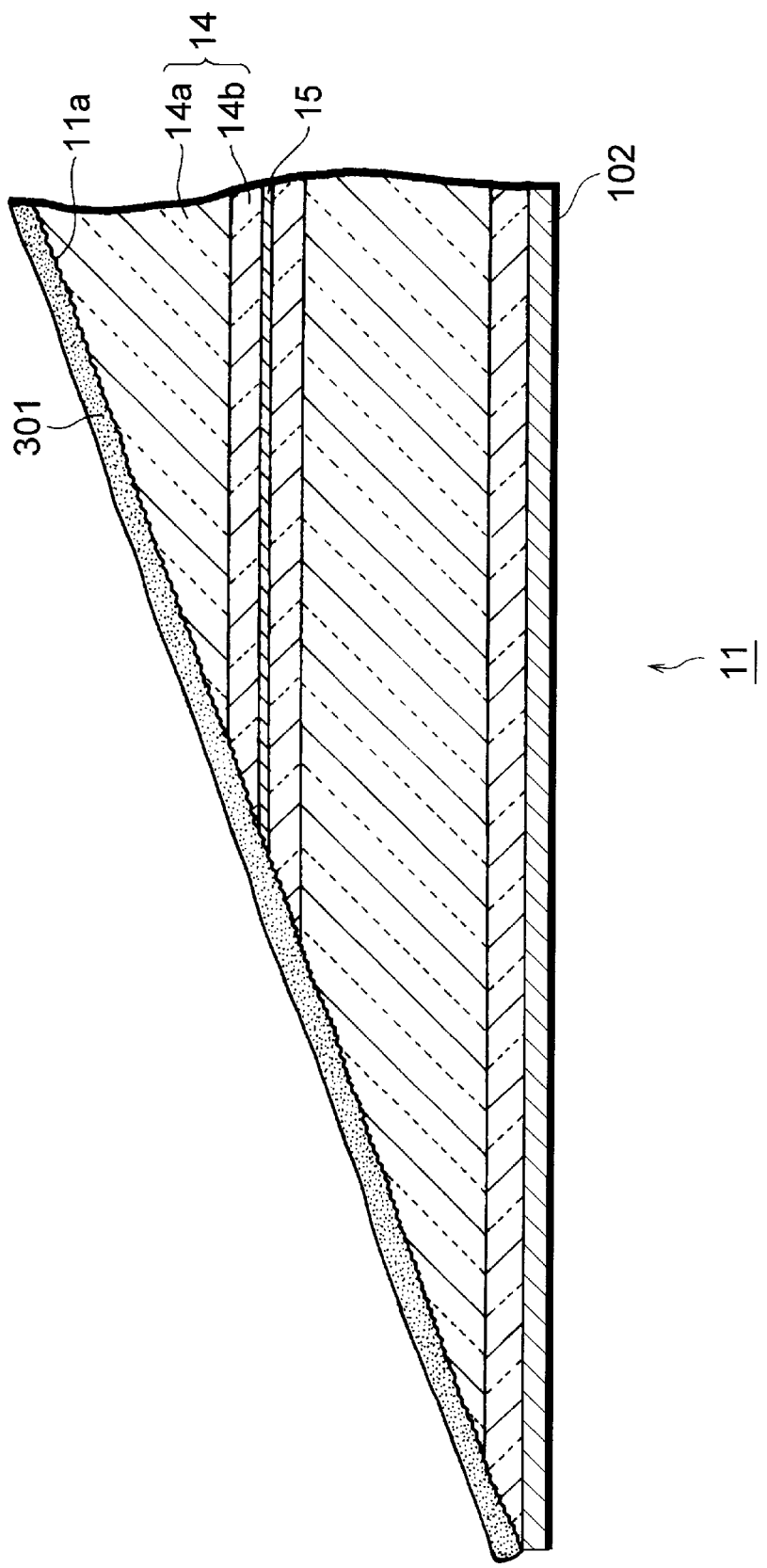
FIG. 11 is a schematic sectional view of the radiation image sensor.

Here, as shown in FIG. 11, which is an enlarged sectional view of the input optical member 11 taken along a plane parallel to the xz plane of FIG. 10, the entrance surface 11a of the input optical member 11 is ground such that the center-line average roughness lies within the range of 0.20 to 0.80 µm (hereinafter referred to as roughly ground). A ground surface having such a range of center-line average roughness can easily be formed, for example, when the surface is ground with an abrasive in which abrasive grains have an average diameter on the order of 6 to 30 µm (e.g., Green Carborundum abrasive grains).

Figure 12:
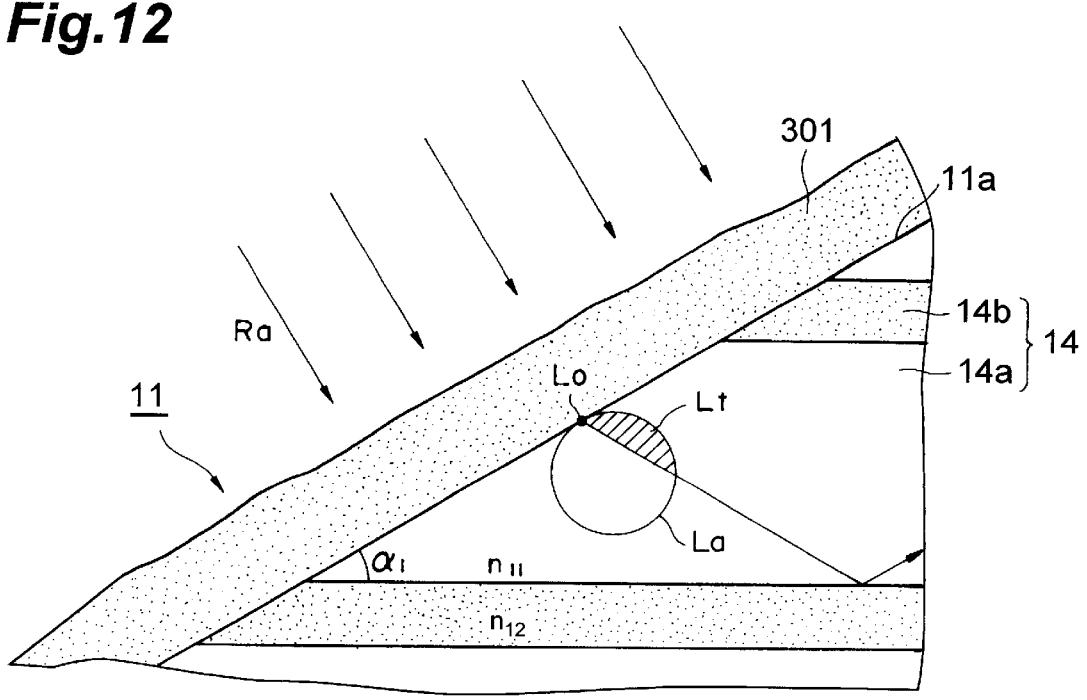
FIG. 12 is an explanatory view showing incidence of a radiation onto the radiation image sensor.
Figure 13:
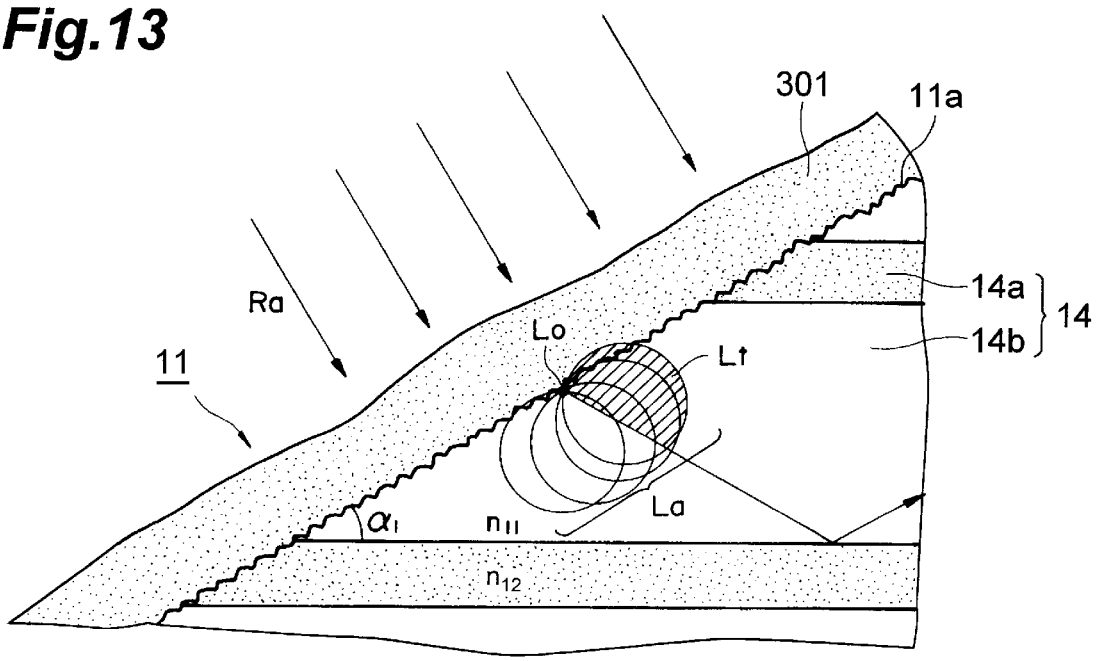
FIG. 13 is an explanatory view showing incidence of a radiation onto the radiation image sensor.

Operations and effects of the radiation image sensor using the optical device in accordance with the above-mentioned embodiment will now be explained. First, a case where light emitted by the radiation incident on the phosphor 301 enters the input optical member 11 will be considered. FIG. 12 shows the state of incidence of light in the case where the entrance surface 11a is not roughly ground, whereas FIG. 13 shows the state of incidence of light in the case where the entrance surface 11a is roughly ground as in the above-mentioned radiation image sensor 300. As shown in FIGS. 12 and 13, the light emitted at a specific point $L_0$ within the phosphor 301 by the radiation $R_a$ incident on the entrance surface 11a from the normal direction of the entrance surface 11a enters the input optical member 11 as diffused light having a maximum intensity in the normal direction of the entrance surface 11a. $L_a$ is a circle indicating the advancing direction and intensity of the light emitted at $L_0$. Namely, the length of the chord formed by a line drawn from $L_0$ in a specific direction and this circle indicates the intensity of light advancing in the specific direction. Also, the hatched area $L_t$ indicates, of the light emitted at $L_0$, the part propagating through the input optical member 11 while satisfying the total reflection condition.

Here, as shown in FIG. 12, the part of light $L_t$ propagating through the input optical member 11 while satisfying the total reflection condition is quite small in the case where the entrance surface 11a is not roughly ground; whereas, as shown in FIG. 13, in the case where the entrance surface 11a is roughly ground, diffused light is scattered so as to have the maximum intensity in various directions, whereby the part of light (hatched area $L_t$) propagating through the input optical member 11 while satisfying the total reflection condition becomes quite large.

Also, since the radiation image sensor 300 comprises the above-mentioned optical device 10, it can efficiently transmit the optical image incident on the entrance surface 11a of the input optical member 11 to the exit surface 12b of the output optical member 12, so that this optical image can be captured by the CCD 101.

As a result, the radiation image sensor 300 can capture, in a clear, high-contrast, high-resolution state, a reduced image of the radiation image incident on the phosphor 301.

Also, since the radiation image sensor 300 combines two optical members together, the position where the CCD 101, which is a sensor section, is disposed deviates from the part directly below the entrance surface 11a of the input optical member 11, which is a detection surface, whereby the influences of damage or noise received by the sensor section from the radiation incident on the detection surface can be reduced.

Figure 14:
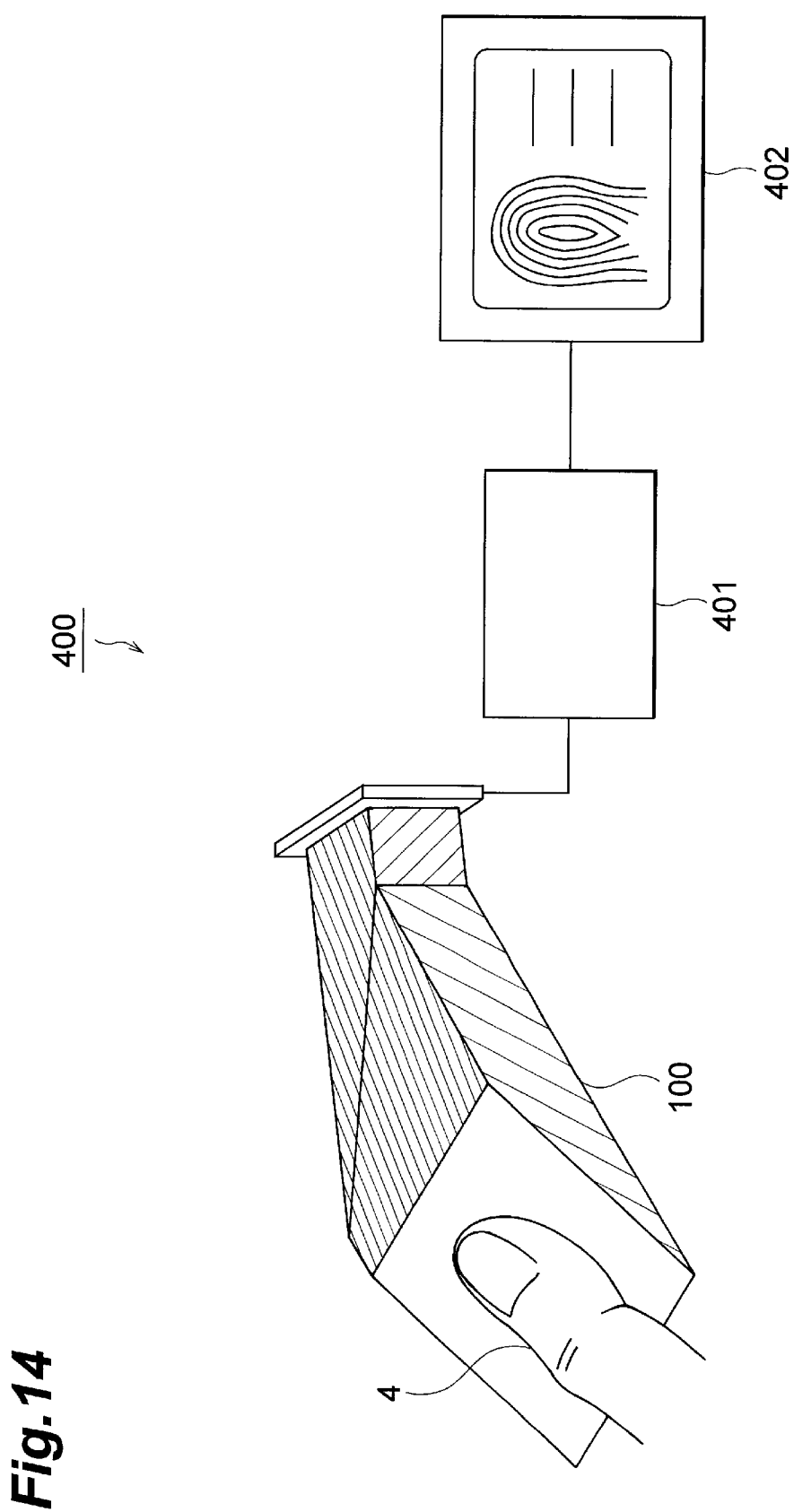
FIG. 14 is a configurational view of a fingerprint identifying apparatus.

(5) Fingerprint Identifying Apparatus Using optical Device According to Embodiment of Present Invention A fingerprint identifying apparatus using the optical device in accordance with the above-mentioned embodiment will now be explained with reference to a drawing. First, the configuration of the fingerprint identifying apparatus using the optical device in accordance with the above-mentioned embodiment will be explained. FIG. 14 is a schematic configurational view of the fingerprint identifying apparatus 400 using the optical device in accordance with the above-mentioned embodiment. The fingerprint identifying apparatus 400 comprises an imaging unit for capturing an image of a fingerprint, an information processing unit 401 which is a fingerprint identifying section for identifying the fingerprint image captured by the above-mentioned imaging unit with a reference pattern registered beforehand, and a display 402 which is a display section for displaying a result of identification obtained by the information processing unit 401.

As the imaging unit for capturing the fingerprint, the imaging unit 100 using the optical device in accordance with the above-mentioned embodiment explained in the foregoing is employed.

The information processing unit 401 comprises a memory for temporarily storing the fingerprint image outputted from the imaging unit 100, a storage device for storing the reference pattern, and an arithmetic unit for identifying the fingerprint image captured by the imaging unit with the reference pattern stored in the storage device.

Operations and effects of the fingerprint identifying apparatus using the optical device in accordance with the above-mentioned embodiment will now be explained. when a finger 4 is brought into contact with the entrance surface 11a of the input optical member 11 constituting the imaging unit 100, then, as explained with reference to FIG. 3, the fingerprint image is transmitted to the exit surface 12b of the output optical member 12 and is captured by the CCD 101.

The fingerprint image captured by the CCD 101 constituting the imaging unit 100 is outputted to the information processing unit 401 and is temporarily stored in the memory. Thereafter, the fingerprint image is identified by the arithmetic unit with the reference pattern registered in the storage device beforehand, and the result of identification is displayed on the display 402 together with the captured fingerprint image and the like.

Since the fingerprint identifying apparatus 400 comprises the above-mentioned optical device 10, it can efficiently transmit the optical image incident on the entrance surface 11a of the input optical device 11 to the exit surface 12b of the output optical member 12. Hence, the CCD 101 can capture a clear, high-contrast, high-resolution, reduced image. As a result, the fingerprint identifying apparatus 400 enables fingerprint identification with a high accuracy with less misidentification.

Figure 15:
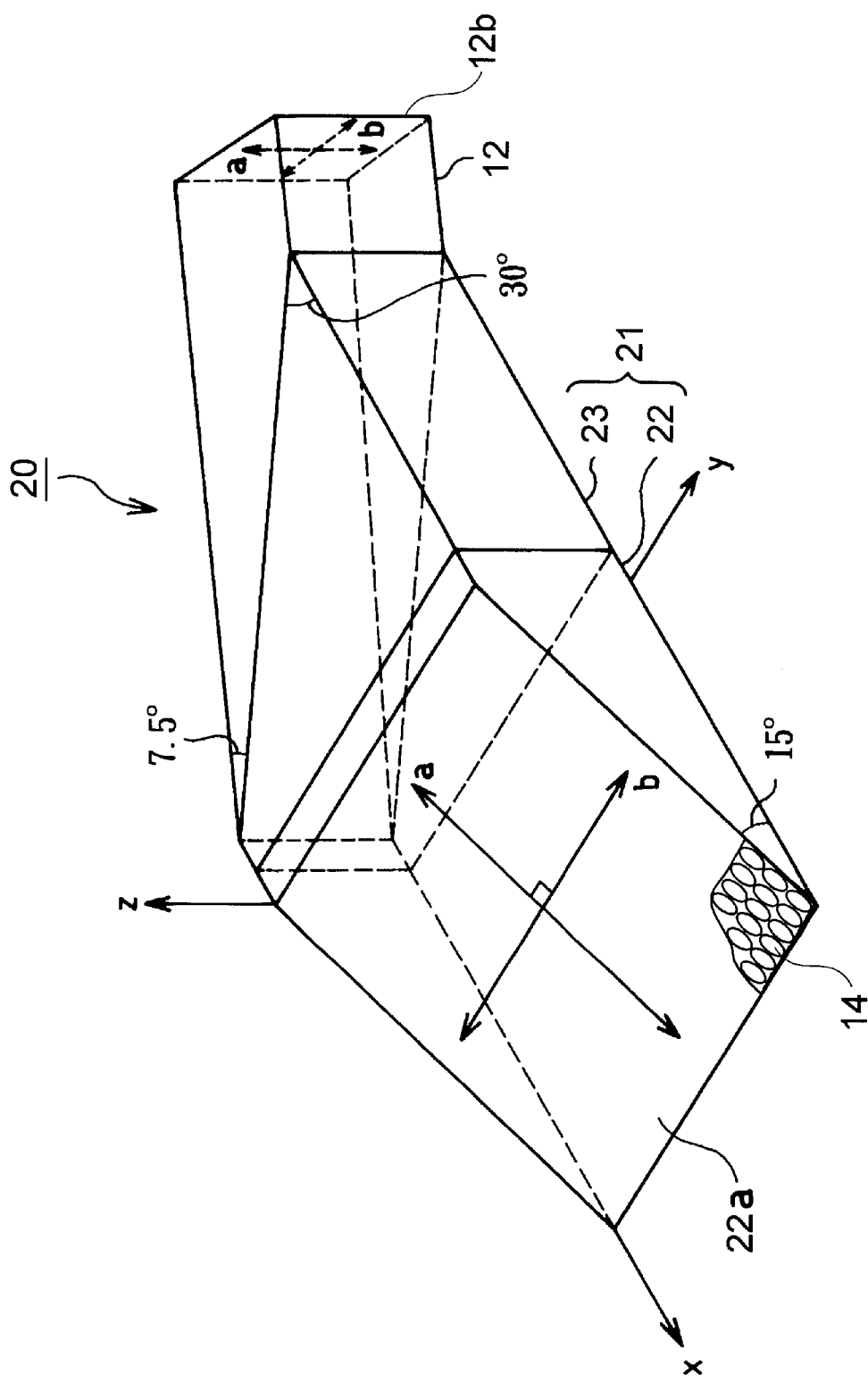
FIG. 15 is a perspective view of an optical device.

(6) Modified Examples of Optical Device According to Embodiment of Present Invention i) First Modified Example The optical device in accordance with a first modified example will now be explained. First, the configuration of the optical device in accordance with this modified example will be explained. FIG. 15 shows the configuration of the optical device 20 in accordance with this modified example. The optical device 20 in accordance with this modified example structurally differs from the optical device 10 in accordance with the above-mentioned embodiment in the following point. Namely, while the gaps among the individual optical fibers 14 in the input optical member 11 used in the optical device 10 in accordance with the above-mentioned embodiment are filled with the light-absorbing material 15, the input optical member 21 used in the optical device 20 in accordance with this modified example is constituted by a first member 22 in which the gaps among the individual optical fibers 14 are not filled with the light-absorbing material 15 and a second member 23 in which the gaps among the individual optical fibers 14 are filled with the light-absorbing material 15.

The first member 22 is constituted by an optical member composed of a plurality of optical fibers 14 arranged parallel to each other and integrally formed, while the gaps among the individual optical fibers 14 are not filled with the light-absorbing material 15. The entrance surface 22a of the first member 22 forms an angle of 15° with the optical axis of the first member 22 such that the incident light from the air does not satisfy the total reflection condition, whereas its exit surface 22b is perpendicular to the optical axis.

Also, the second member 23 is constituted by an optical member composed of a plurality of optical fibers 14 arranged parallel to each other and integrally formed, while the gaps among the individual optical fibers 14 are filled with the light-absorbing material 15. The entrance surface 23a of the second member 23 is perpendicular to the optical axis of the second member 23, whereas the exit surface 23b of the second member 23 is cut obliquely with respect to the optical axis of the second member 23 at an angle of 30°.

Figure 16:
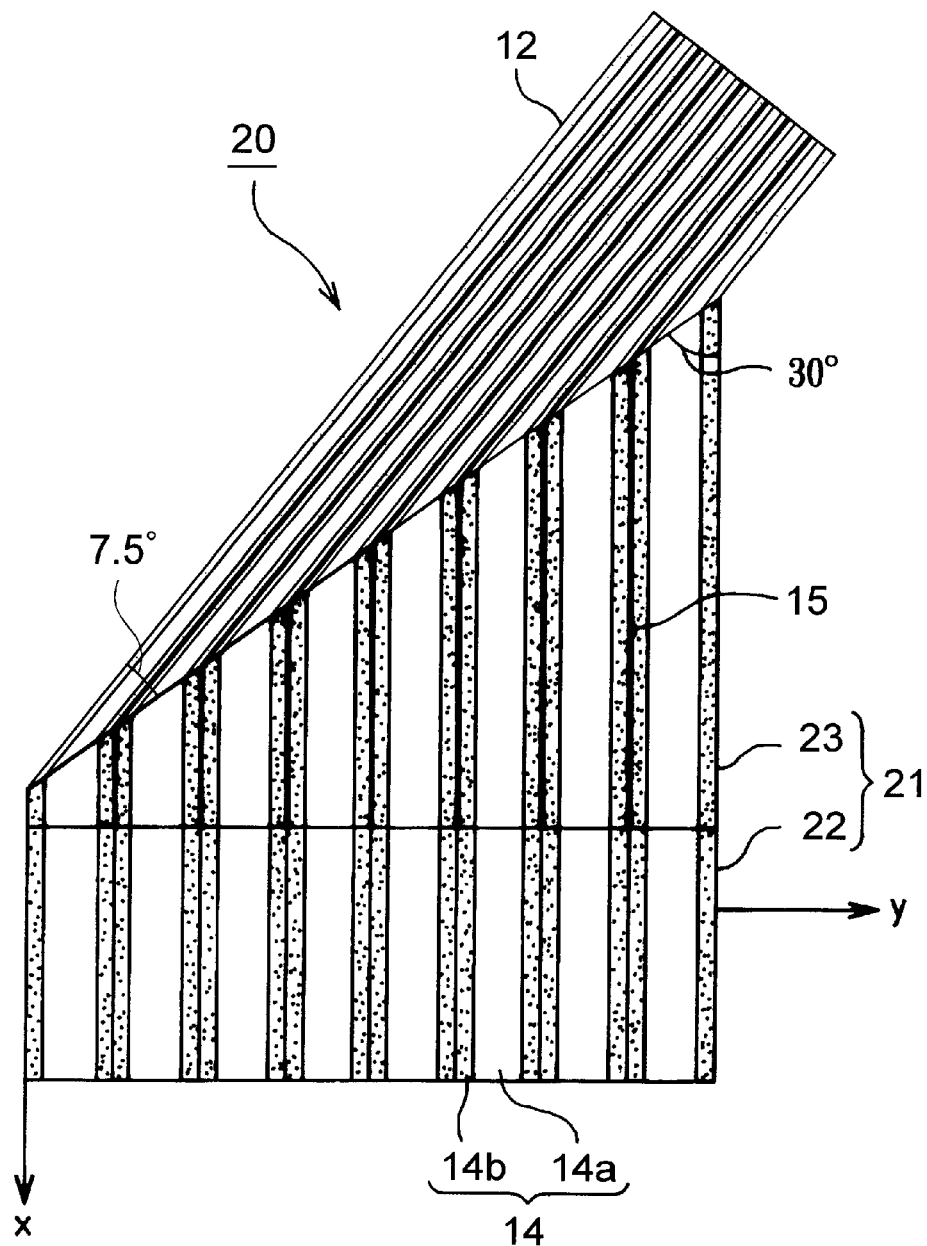
FIG. 16 is a schematic sectional view of the optical device.

The exit surface 22b of the first member 22 and the entrance surface 23a of the second member 23 are in contact with each other, whereas both of the optical axes of the first member 22 and second member 23 are parallel to the xy plane of FIG. 15. Consequently, when the optical device 20 in accordance with this modified example is cut along a plane parallel to the xy plane, a cross section shown in FIG. 16 is obtained.

Figure 17:
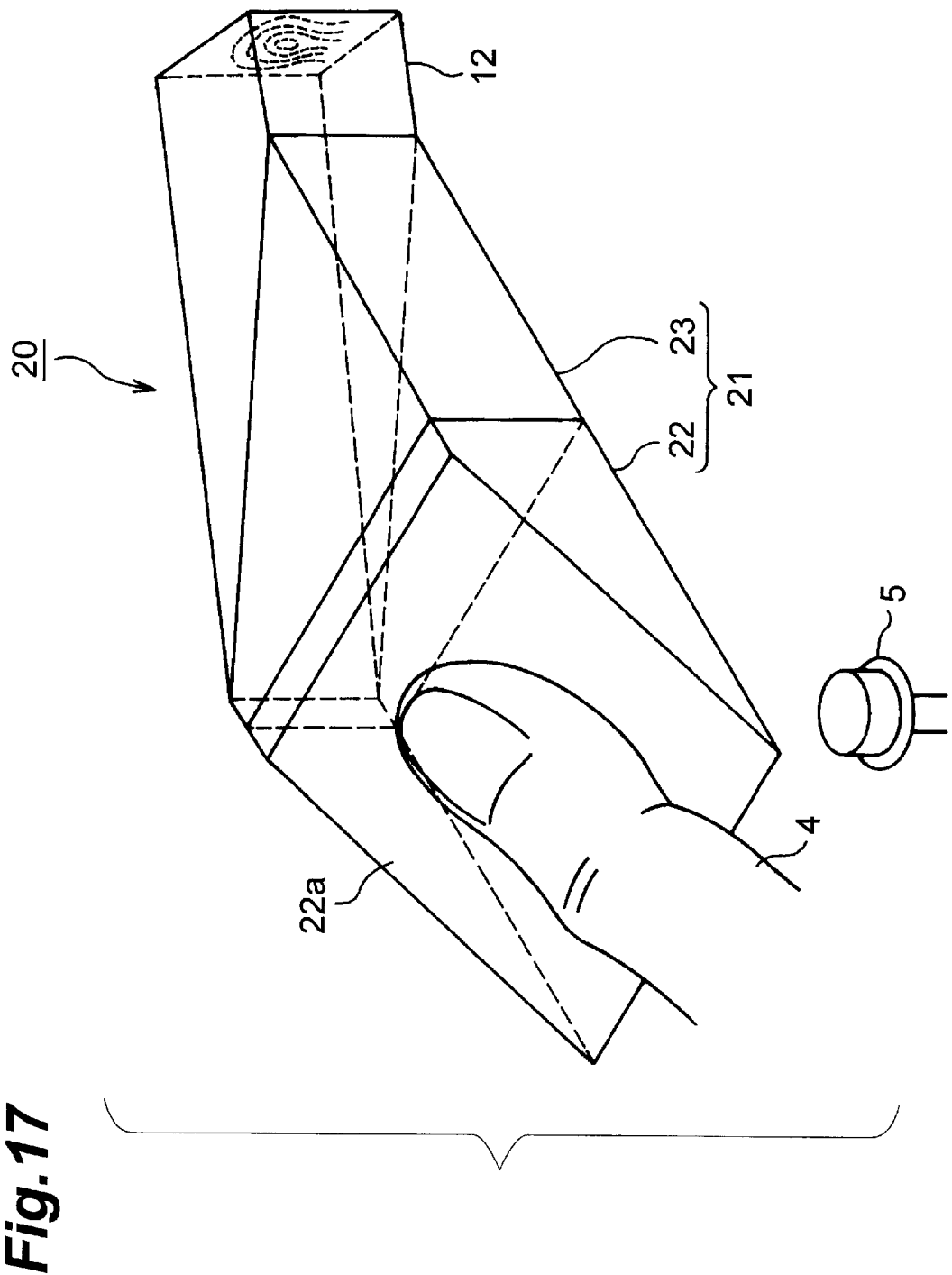
FIG. 17 is a perspective view of an optical device.

Operations and effects of the optical device in accordance with this modified example will now be explained. For example, when the optical device 20 is used for reducing and capturing a fingerprint image, it is arranged as shown in FIG. 17. Namely, a finger 4 is brought into contact with the entrance surface 22a of the first member 22, and light is projected by an LED 5 disposed below the first member 22. The light projected from the LED 5 or the like is transmitted through the first member 22 from the bottom to the top and is reflected by the entrance surface 22a. If a protrusion of the fingerprint is in contact with the entrance surface 22a, then the projected light is not reflected at this portion and is absorbed. As a consequence, the light reflected by the part other than the contact portion of protrusions of the fingerprint is transmitted through each optical member and is outputted from the exit surface 12b of the output optical member 12 as a fingerprint pattern.

In particular, the second member 23 acts to prevent the S/N ratio of the output image from deteriorating due to the illumination light emitted from the LED 5 or the like directly entering the output optical member 12 or the light scattered within the first member 22 entering the output optical member 12.

As with the optical device 10 in accordance with the above-mentioned embodiment, the optical device 20 in accordance with this example can efficiently transmit the optical image incident from the entrance surface 22a of the first member 22 of the input optical member 21 to the exit surface 12b of the output optical member 12, whereby an output pattern with a high resolution can be obtained.

ii) Second Modified Example

The optical device in accordance with a second modified example will now be explained with reference to drawings.

Figure 18:
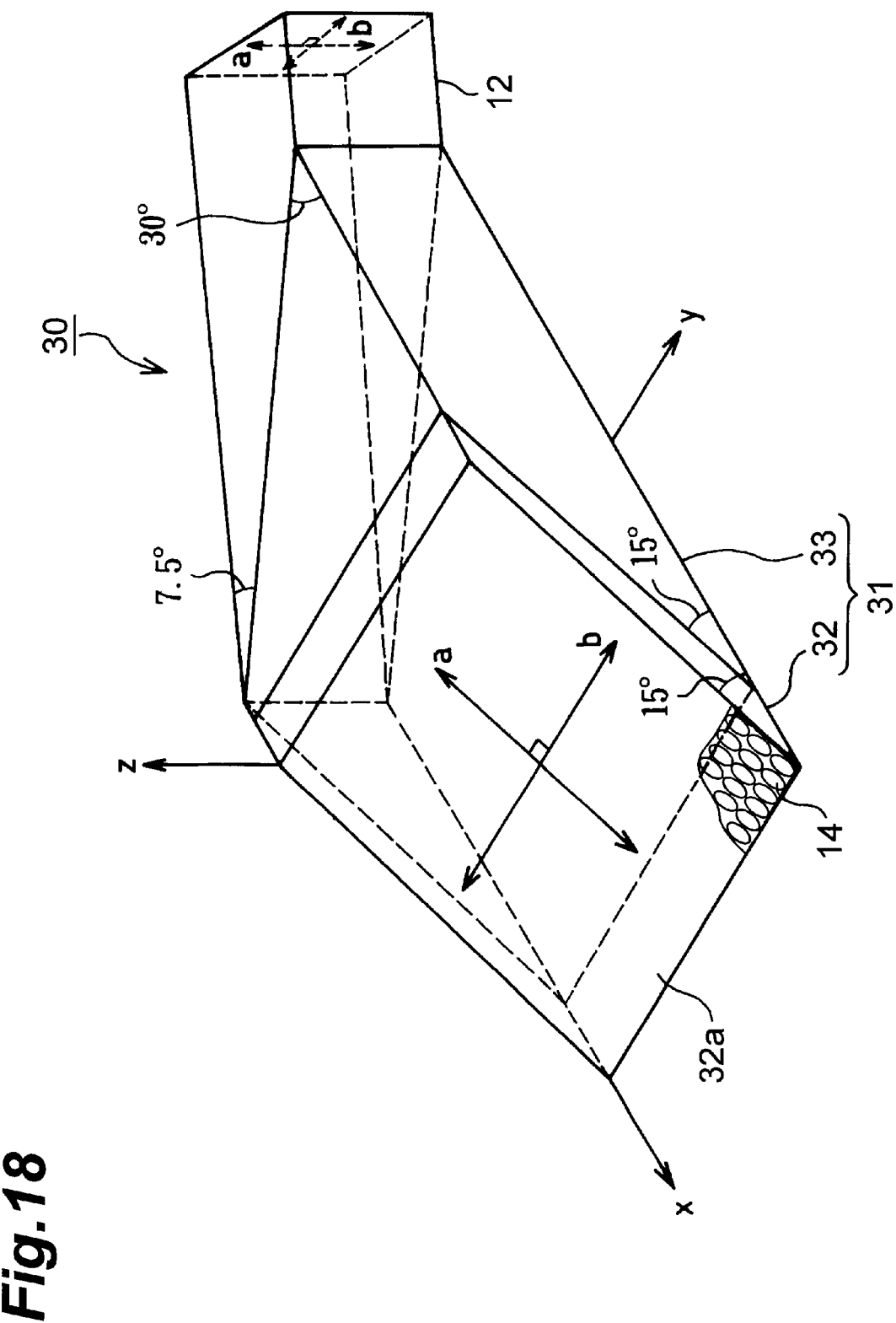
FIG. 18 is a perspective view of an optical device.

First, the configuration of the optical device in accordance with this modified example will be explained. FIG. 18 shows the configuration of the optical device in accordance with this modified example. The optical device 30 in accordance with this modified example structurally differs from the optical device 20 in accordance with the first modified example in the following point. Namely, while the input optical member 21 in the optical device 20 in accordance with the first modified example comprises the first member 22 having the exit surface 22b perpendicularly cut with respect to the optical axis, the first member 32 in the optical device 30 in accordance with this modified example has an entrance surface 32a obliquely cut with respect to the optical axis and an exit surface 32b cut parallel to the entrance surface 32a.

The first member 32 is constituted by an optical member composed of a plurality of optical fibers arranged parallel to each other and integrally formed, while the gaps among the individual optical fibers 14 are not filled with the light-absorbing material 15. The entrance surface 32a of the first member 32 forms an angle of 15° with the optical axis of the first member 32 such that the incident light from the air does not satisfy the total reflection condition within the optical fibers constituting the first member 32, and its exit surface 32b forms, as with the entrance surface 32a, an angle of 15° with the optical axis.

Also, the second member 33 is constituted by an optical member composed of a plurality of optical fibers arranged parallel to each other and integrally formed while the gaps among the individual optical fibers 14 are filled with the light-absorbing material 15. The entrance surface 33a of the second member 33 forms an angle of 15° with the optical axis of the second member 33, whereas its exit surface 33b forms an angle of 30° with the optical axis of the second member 33.

Figure 19:
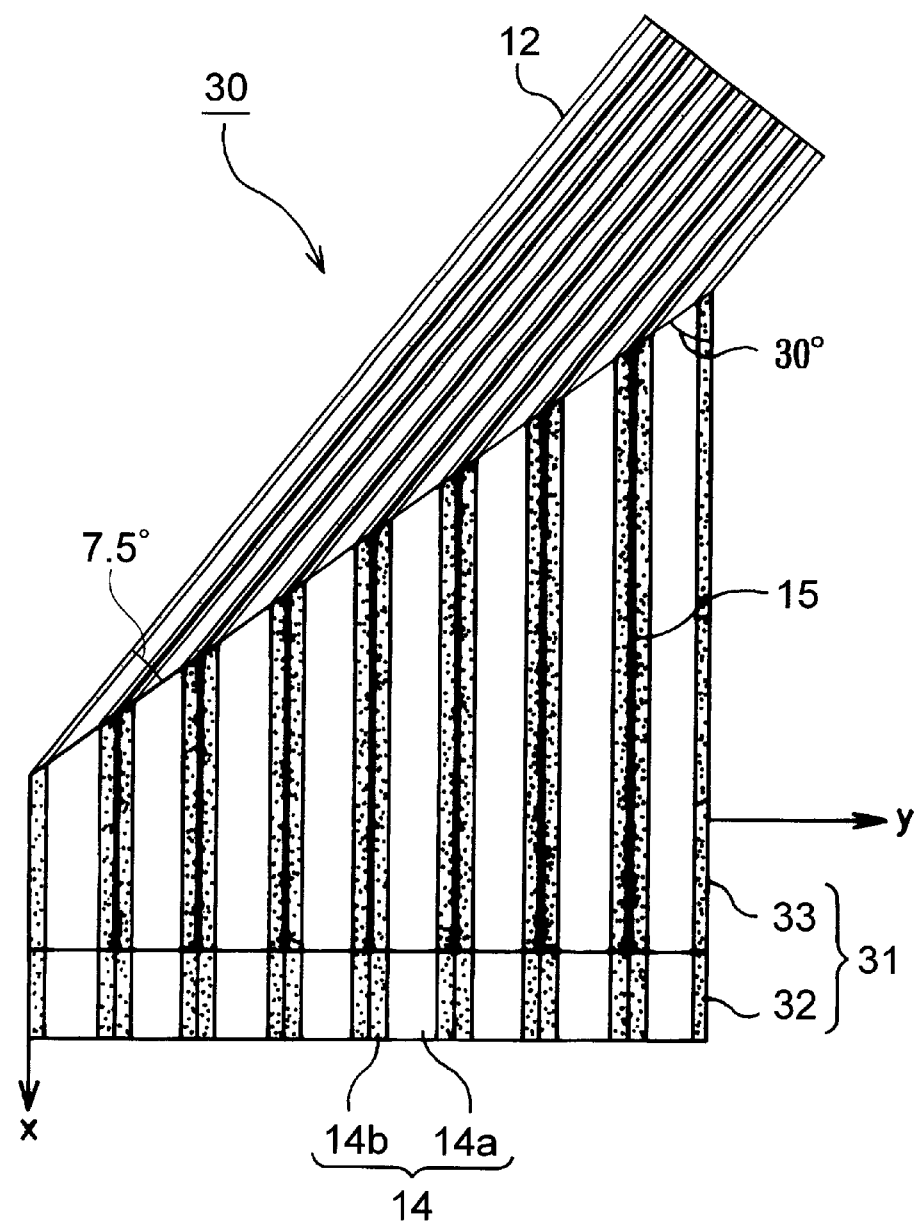
FIG. 19 is a schematic sectional view of the optical device.

The exit surface 32b of the first member 32 and the entrance surface 33a of the second member 33 are in contact with each other, whereas both of the optical axes of the first member 32 and second member 33 are parallel to the xy plane of FIG. 18. Consequently, when the optical device 30 in accordance with this modified example is cut along a plane parallel to the xy plane in FIG. 18, a cross section shown in FIG. 19 is obtained.

Operations and effects of the optical device in accordance with this embodiment will now be explained. As with the optical device 20 in accordance with the above-mentioned first modified example, the optical device 30 in accordance with this example can efficiently transmit the optical image incident from the entrance surface 32a of the first member 32 of the input optical member 31 to the exit surface 12b of the output optical member 12, whereby an output pattern with a high resolution can be obtained.

iii) Other Modified Examples

When an optical image is made incident from the exit surface 12b of the output optical member 12, the above-mentioned optical device 10, 20, or 30 can be used as an optical device which enlarges and transmits the optical image. Optical images can be transmitted with a favorable efficiency also when the optical device 10, 20, or 30 is employed as an optical device for enlarging and transmitting the optical images.

Further, though the optical device 10, 20, or 30 is an optical device for similarly reducing input images, it is not necessarily be used for similar reduction. A given demagnification can be obtained when the angles formed between the optical axis of the input optical member and its entrance surface and exit surface, and the angles formed between the optical axis of the output optical member and its entrance surface and exit surface are changed appropriately.

(7) Modified Example of Imaging Unit Using Optical Device According to Embodiment of Present Invention Though the above-mentioned imaging unit 100 mainly comprises the above-mentioned optical device 10 and CCD 101, it may mainly comprise the optical device 20 in accordance with the above-mentioned first modified example or the optical device 30 in accordance with the above-mentioned second modified example and the CCD 101.

Also, though all the side faces of each optical device are provided with the light-shielding material 102 in the above-mentioned imaging unit 100, it may not be formed on all the side faces. In the case where the optical device 20 in accordance with the first modified example or the optical device 30 in accordance with the second modified example is used for constituting the imaging unit, in particular, it is preferred that the side faces be formed with a part having no light-shielding material 102 in order for the light to be incident on the entrance surface of the first member constituting the input optical member.

(8) Modified Example of Imaging Apparatus Using Optical Device According to Embodiment of Present Invention A modified example of the imaging apparatus using the optical device in accordance with the embodiment of the present invention will now be explained. Though the imaging apparatus 200 explained with reference to FIG. 9 is constituted by four sets of imaging units 100 explained with reference to FIG. 8, they are not restricted to four sets, but may be varied according to the size of imaging patterns.

Figure 20:
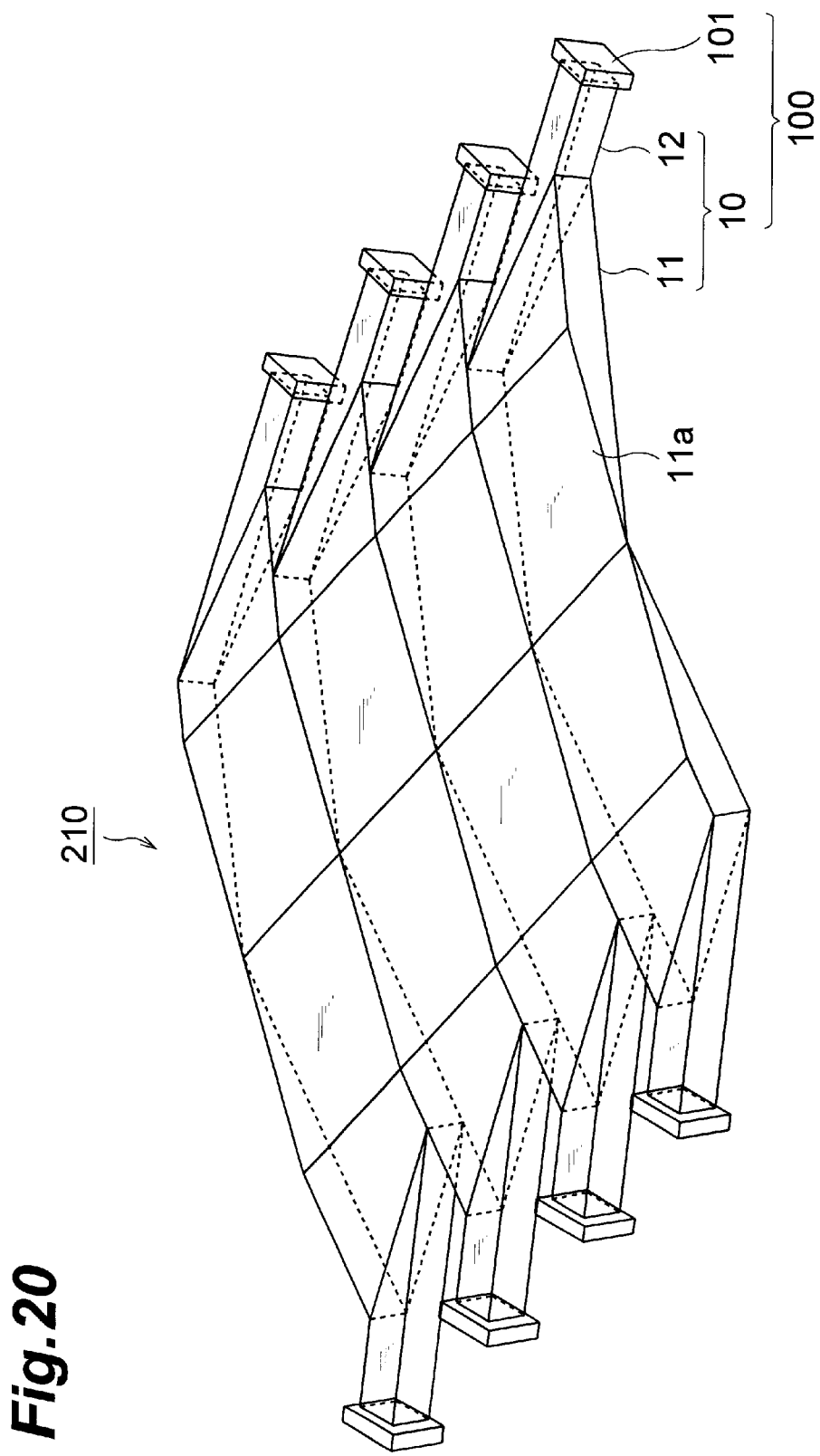
FIG. 20 is a perspective view of the an imaging apparatus.
Figure 21:
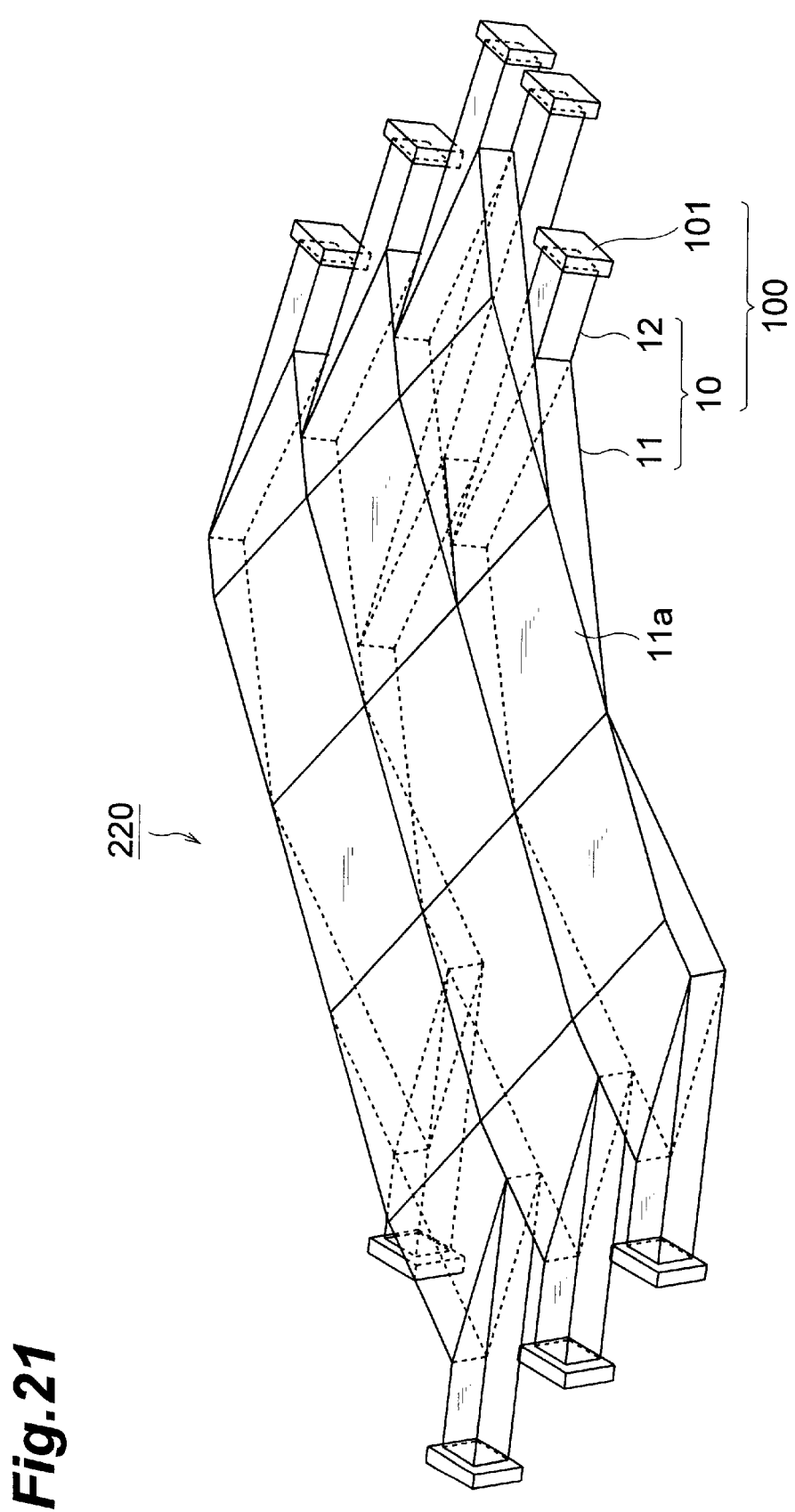
FIG. 21 is a perspective view of an imaging apparatus.

For example, 8 sets of imaging units 100 may be assembled to constitute an imaging apparatus 210 as shown in FIG. 20. Also, 12 sets of imaging units 100 may be assembled to constitute an imaging apparatus 220 as shown in FIG. 21.

Figure 22:
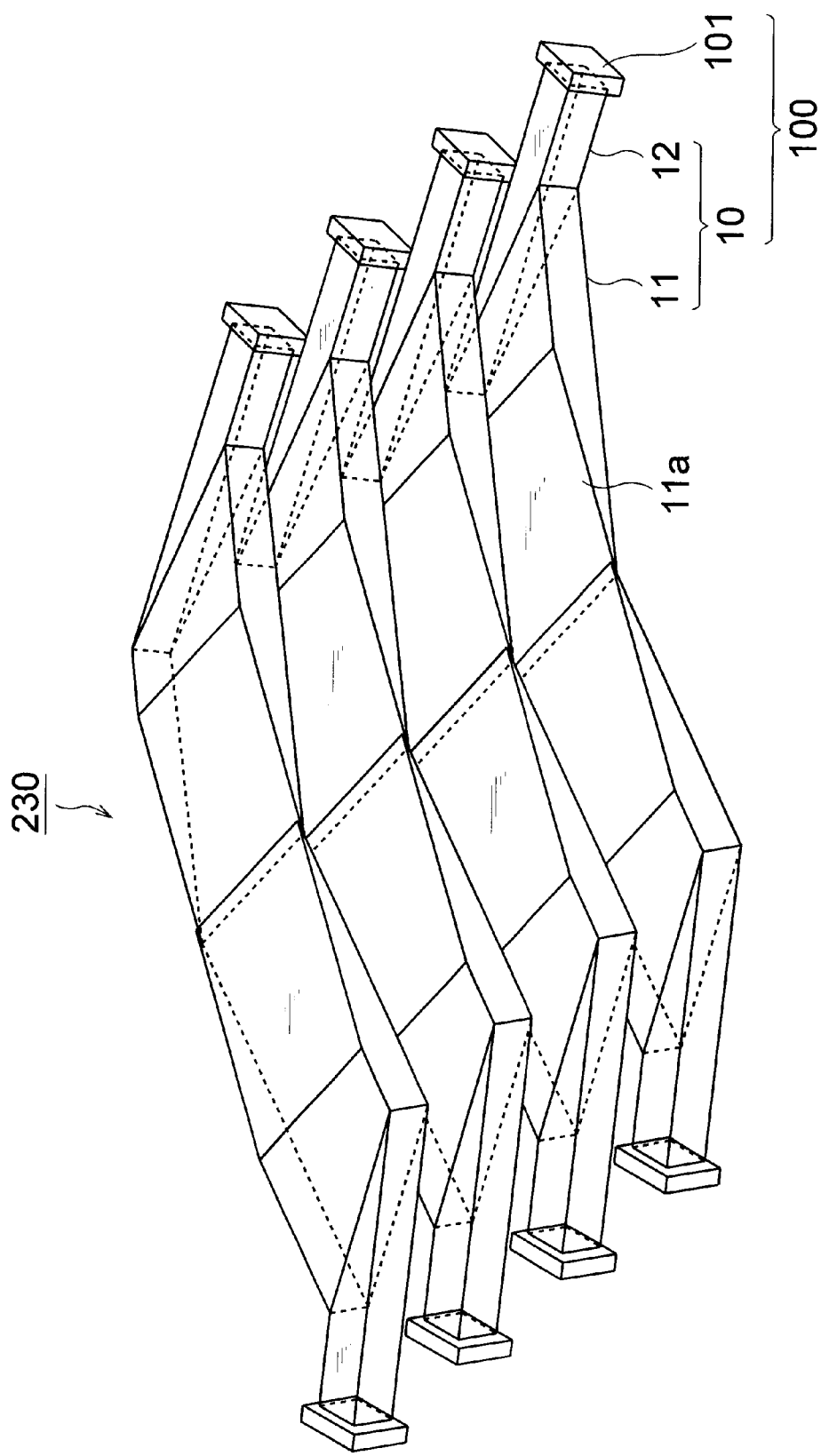
FIG. 22 is a perspective view of an imaging apparatus.

Further, though the individual imaging units 100 are arranged without gaps such that the entrance surfaces 11a of their respective input optical members 11 do not overlap each other, so as to constitute each of the above-mentioned imaging apparatus, the imaging units 100 may be arranged such that the edge side portions of the entrance surfaces 11a of the input optical members 11 overlap each other as in the imaging apparatus 230 shown in FIG. 22. When the edge side portions of the entrance surfaces 11a of the input optical members 11 are arranged in an overlapping fashion, then influences of dead spaces occurring in the edge side portions can be eliminated. Here, data in the overlapping areas can be eliminated by image processing as appropriate.

(9) Modified Example of Radiation Image Sensor Using Optical Device According to Embodiment of Present invention A modified example of the radiation image sensor using the optical device in accordance with the embodiment of the present invention will now be explained. First, the configuration of the radiation image sensor in accordance with this modified example will be explained. Though the entrance surface 11a of the input optical member 11 is roughly ground in the radiation image sensor 300 explained with reference to FIG. 10 in order for the light generated upon incidence of a radiation on the phosphor 301 to efficiently enter the input optical member 11, a flat optical member 311 as indicated in the following may be provided instead of roughly grinding the entrance surface 11a of the input optical member 11. It will be explained in detail in the following.

Figure 23:
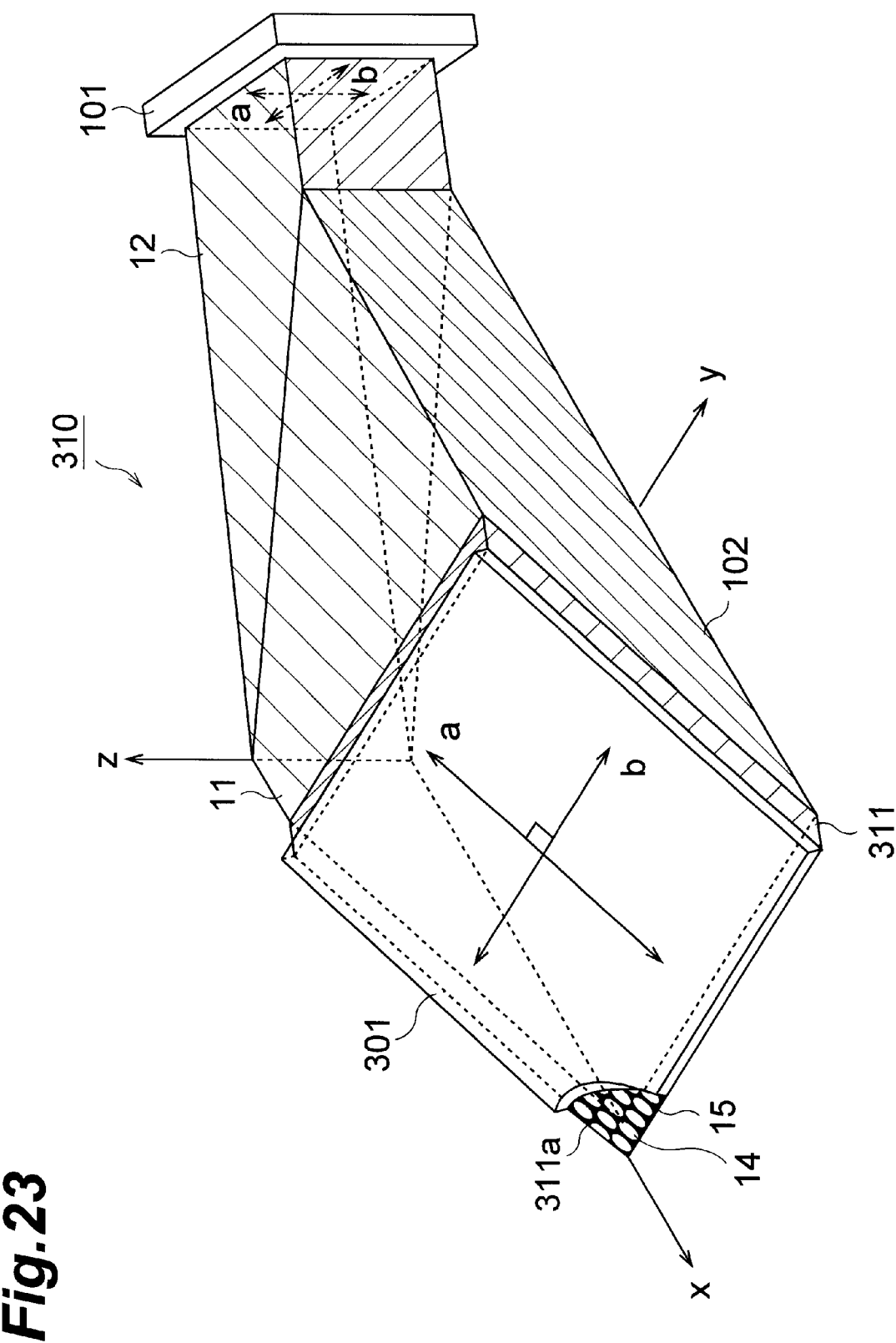
FIG. 23 is a perspective view of a radiation image sensor.

The radiation image sensor 310 comprises, as shown in FIG. 23, the above-mentioned imaging unit 100 (i.e., imaging unit 100 comprising the input optical member 11, the output optical member 13, the CCD 101, and the light-shielding material 102); the flat optical member 311 disposed on the entrance surface 11a of the input optical member 11 constituting the imaging unit 100; and the phosphor 301, disposed on the entrance surface 311a of the flat optical member 311, for emitting light upon incidence of a radiation.

The flat optical member 311 is composed of a number of optical fibers 14 arranged parallel to each other and integrally formed. Also, the flat optical member 311 has the entrance surface 311a obliquely cut with respect to the optical axis at an angle of 50° and an exit surface 311b cut parallel to the entrance surface 311a, whereas all the surfaces of the flat optical member 311 excluding the entrance surface 311a and exit surface 311b are covered with the light-shielding material 102. The entrance surface 311a of the flat optical member 311 is formed with the phosphor 301 adapted to emit light upon incidence of a radiation.

Figure 24:
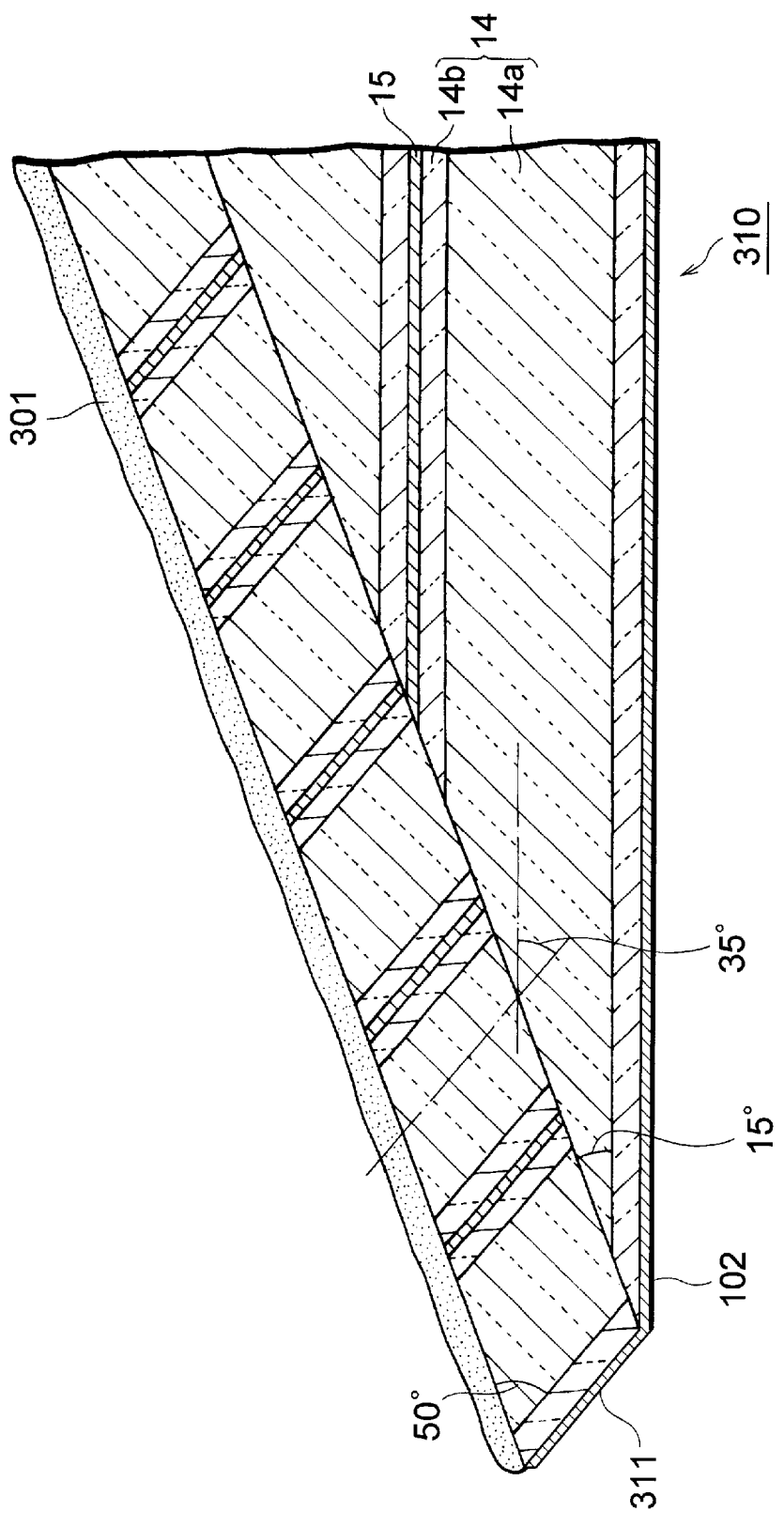
FIG. 24 is a schematic sectional view of the radiation image sensor.

The exit surface 311b of the flat optical member 311 and the entrance surface 11a of the input optical member 11 are in contact with each other, the exit surface 11b of the input optical member 11 and the entrance surface 12a of the output optical member 12 are in contact with each other, and the exit surface 12b of the output optical member 12 and the light-receiving surface of the CCD 101 are in contact with each other. Here, as shown in FIG. 24 which is an enlarged sectional view of the radiation image sensor 310 taken along a plane parallel to the xz plane of FIG. 23, the flat optical member 311 and the input optical member 11 are arranged such that the angle (35°) formed between the optical axis of the flat optical member 311 and the optical axis of the input optical member 11 is the difference between the angle (50°) formed between the optical axis of the flat optical member 311 and its exit surface 311b and the angle (15°) formed between the optical axis of the input optical member 11 and its entrance surface 11a.

Figure 25:
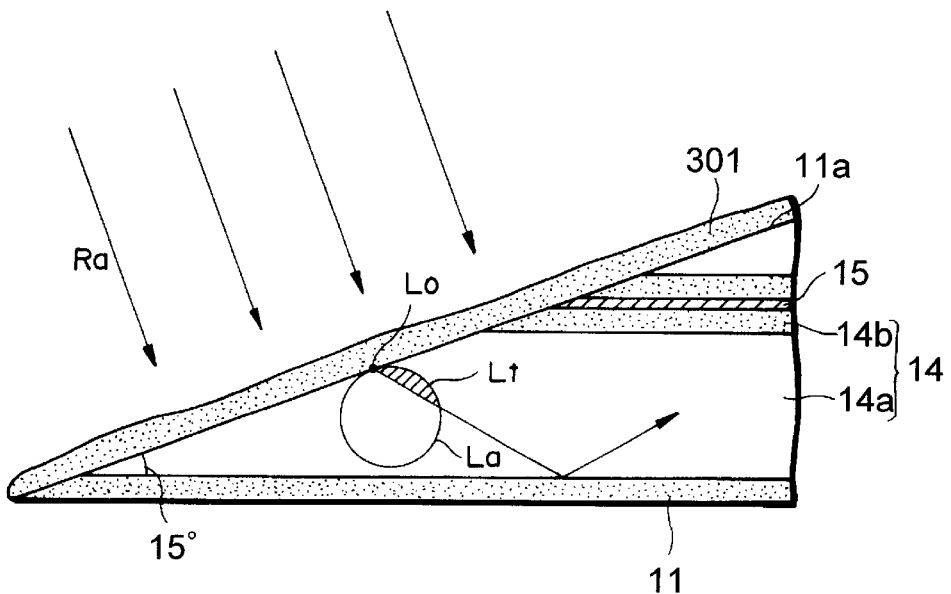
FIG. 25 is a schematic sectional view of the radiation image sensor.

Operations and effects of the radiation image sensor 310 will now be explained. FIG. 25 shows the state of incidence of light in the case where the light emitted by the phosphor upon incidence of a radiation enters the entrance surface 11a of the input optical member 11 without the aid of the flat optical member 311, whereas FIG. 26 shows the state of incidence of light in the case where the light enters the entrance surface 311a of the flat optical member 311.

Figure 26:
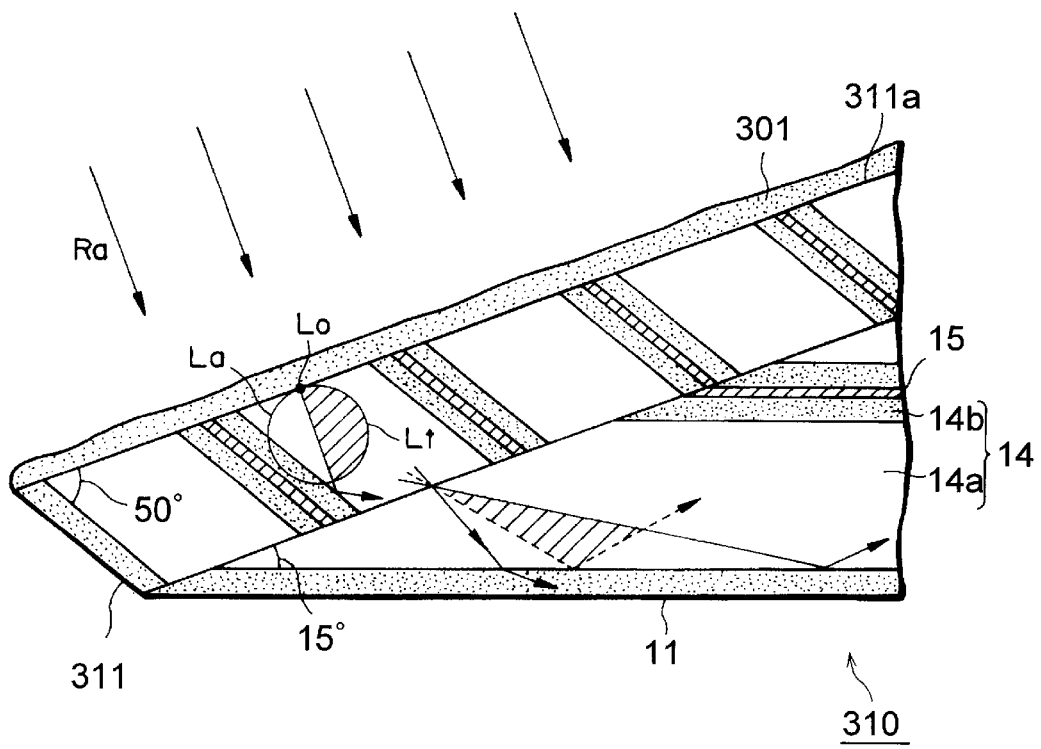
FIG. 26 is a schematic sectional view of the radiation image sensor.

$L_a$ shown in FIGS. 25 and 26 is a circle indicating the advancing direction and intensity of the light emitted at $L_0$ as with the one shown in FIGS. 12 and 13. Here, the length of the chord formed by a line drawn from $L_0$ in a specific direction and this circle indicates the intensity of light advancing in the specific direction. Also, the hatched area $L_t$ indicates, of the light emitted at $L_0$, the part propagating through the optical fibers 14 constituting the optical members while satisfying the total reflection condition.

Here, in the case where the flat optical member 311 is not provided, as shown in FIG. 25, of the diffused light $L_a$ emitted from $L_0$, the ratio of light (hatched area $L_t$) propagating through the optical fibers 14 constituting the input optical member 11 while satisfying the total reflection condition is quite small, since the angle formed between the normal direction of the entrance surface 11a and the optical axis is large by contrast, in the case where the flat optical member 311 is provided, as shown in FIG. 26, the angle formed between the normal direction of the entrance surface 311a and the optical axis can be reduced, so that, of the diffused light $L_a$ emitted from $L_0$, the ratio of light (hatched area $L_t$) propagating through the optical fibers 14 constituting the flat optical member 311 while satisfying the total reflection condition can be increased. As a result, the amount of light transmitted through each of the optical members constituting the radiation image sensor 310 increases, whereby a quite clear captured image can be obtained by the CCD 101.

Figure 27:
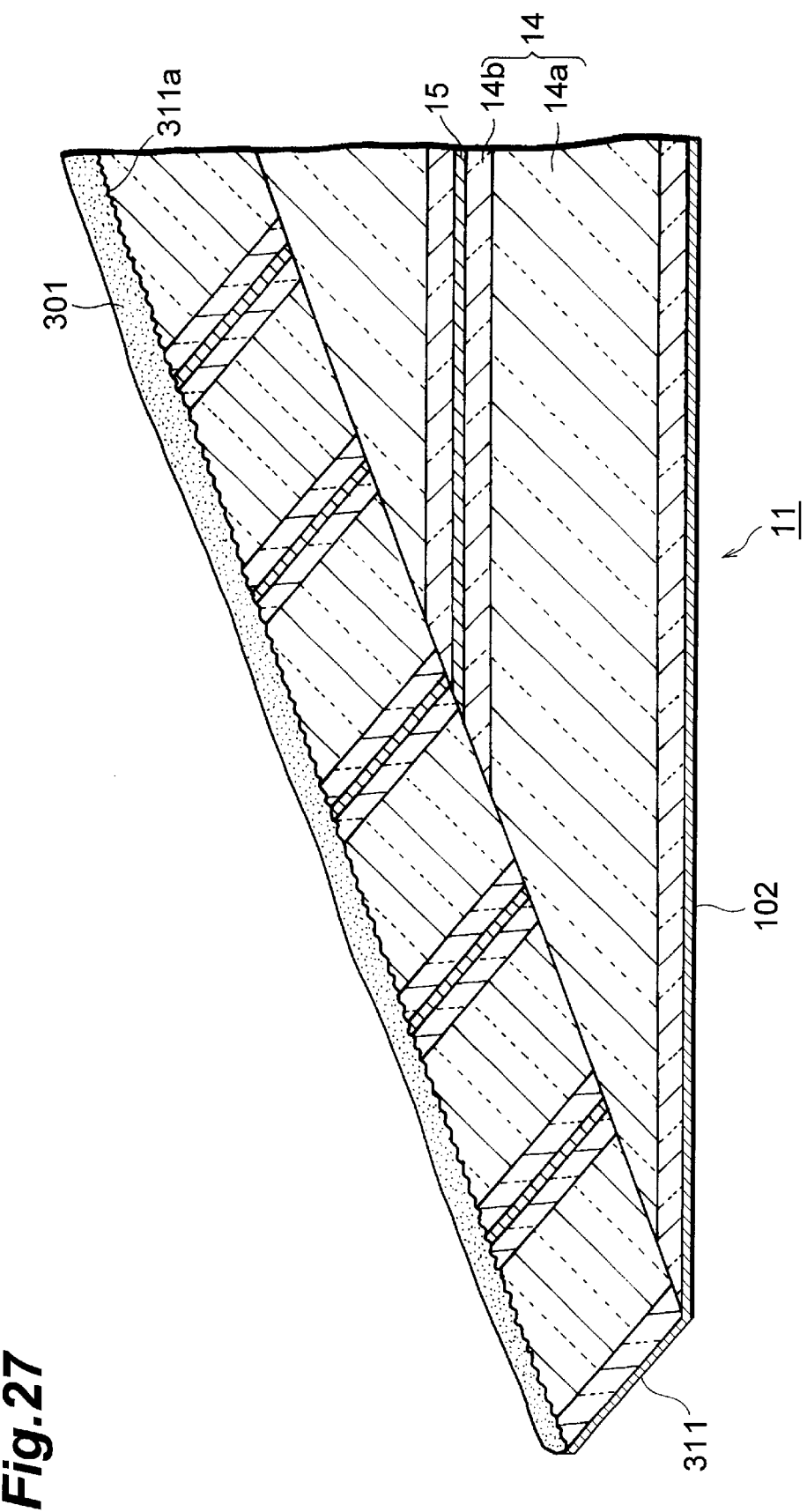
FIG. 27 is a schematic sectional view of the radiation image sensor.

Also, when the flat optical member 311 is provided as mentioned above, the entrance surface 311a of the flat a optical member 311 may be ground, as shown in FIG. 27, such that the center-line average roughness lies within the range of 0.20 to 0.80 $\mu$m. When the entrance surface 311a of the flat optical member 311 is roughly ground, the light generated upon incidence of a radiation on the phosphor 301 is scattered by the entrance surface 311a of the flat optical member 311, so that the light is incident on the flat optical member 311 with a wider angle of incidence, whereby the ratio of light advancing through each optical member while satisfying the total reflection condition increases.

Though the entrance surface 11a of the input optical member 11 constituting the radiation image sensor 300 or the entrance surface 311a of the flat optical member 311 constituting the radiation image sensor 310 is ground such that the center-line average roughness lies within the range of 0.20 to 0.80 $\mu$m, the following configuration may be employed as well.

Figure 28:
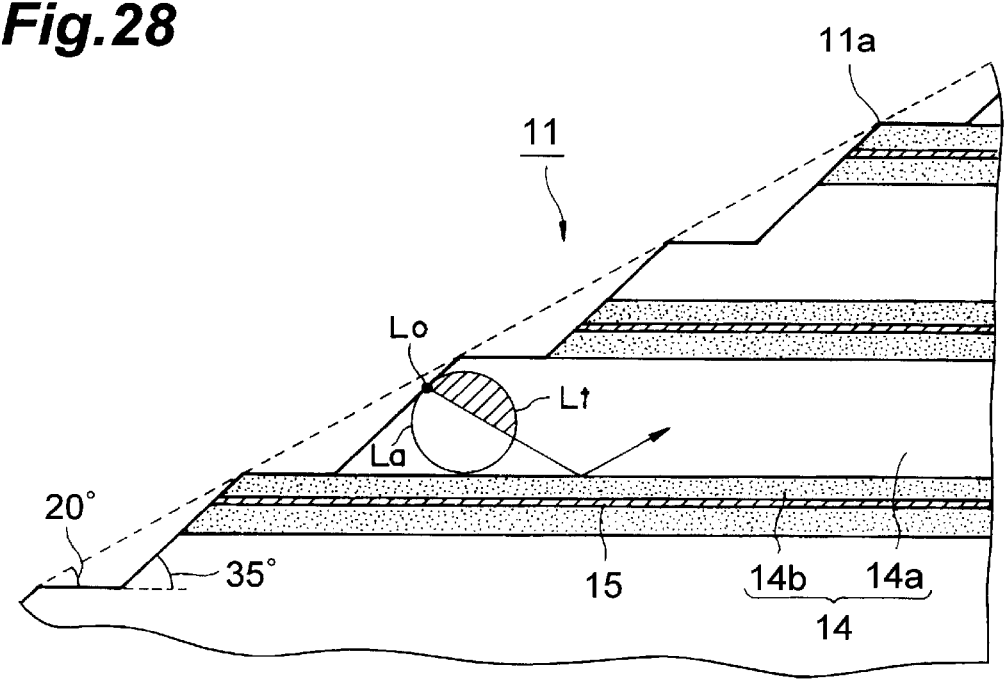
FIG. 28 is a schematic sectional view of the radiation image sensor.
Figure 29:
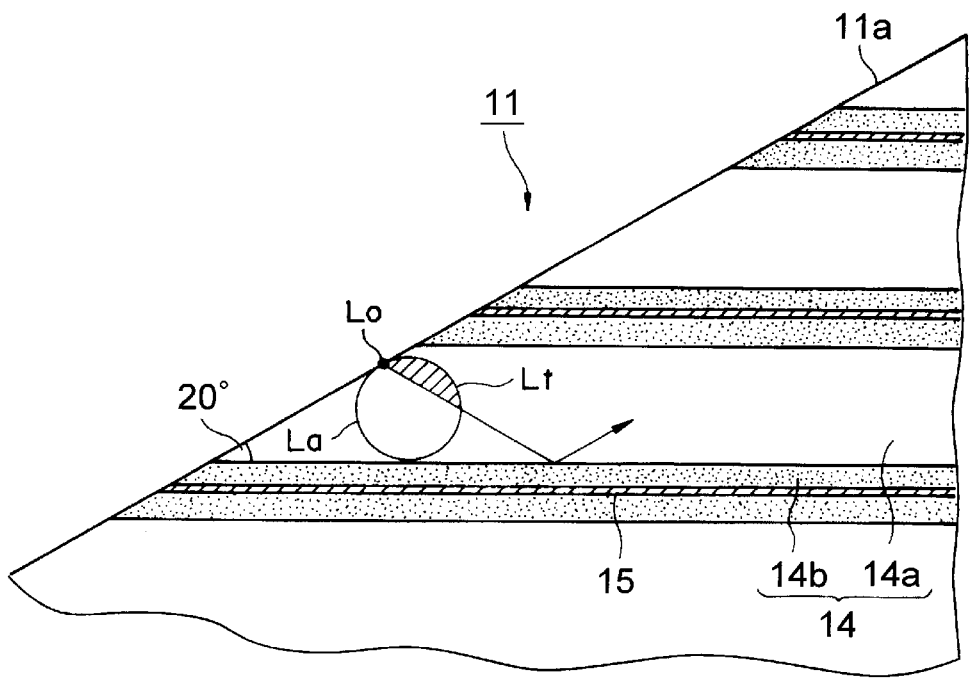
FIG. 29 is a schematic sectional view of the radiation image sensor.

Namely, as shown in FIG. 28, the entrance surface 11a of the input optical member 11 may be cut stepwise in its tilting direction. As a consequence of such processing, while the entrance surface as a whole maintains an angle of 20° with respect to the optical axis, portions having an angle of 35° with respect to the optical axis are partly formed therein. As a result, the angle formed between the normal of such a portion and the fiber axis becomes smaller, whereby the ratio of light propagating through each optical member while satisfying the total reflection condition can be increased as compared with the input optical member 11 shown in FIG. 29 uniformly having an angle of 20° with respect to the optical axis.

Figure 30:
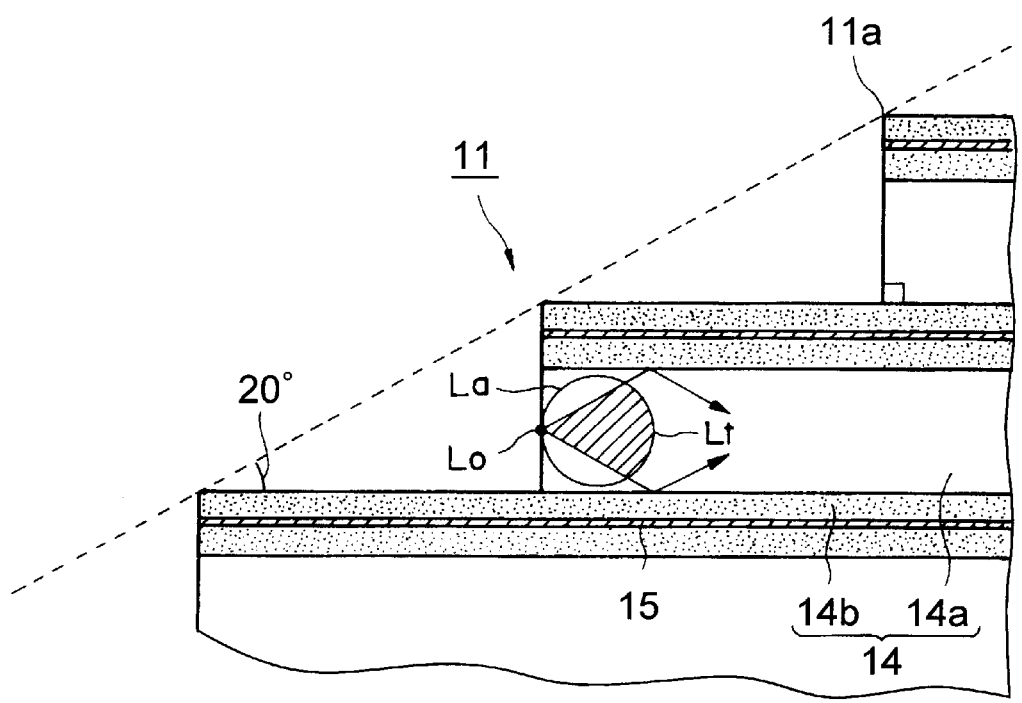
FIG. 30 is a schematic sectional view of the radiation image sensor.

Also, as shown in FIG. 30, the entrance surface 11a of the input optical member 11 can be processed stepwise such that it becomes partly perpendicular to the optical axis. Such processing also makes it possible to increase the ratio of light propagating through each optical member while satisfying the total reflection condition as compared with the input optical member 11 shown in FIG. 29 uniformly having an angle of 20° with respect to the optical axis.

INDUSTRIAL APPLICABILITY

As mentioned above, the optical device of the present invention can be used in radiation image sensors and fingerprint identifying apparatus, for example.

What is claimed is:
1. An optical device comprising:
a first optical member, composed of a plurality of optical fibers arranged parallel to each other and integrally formed, having a first entrance surface and a first exit surface which intersect an optical axis at respective angles of $\alpha_1, \beta_1$; and
a second optical member, composed of a plurality of optical fibers arranged parallel to each other and integrally formed, having a second entrance surface and a second exit surface which intersect an optical axis at respective angles of $\alpha_2, \beta_2$;
wherein said first exit surface and said second entrance surface are in contact with each other;
wherein said $\beta_1$ is smaller than 90°; and wherein an angle $\theta_1$ formed between the optical axis of said first optical member and the optical axis of said second optical member is an angle of difference between $\beta_1$ and $\alpha_2$.

2. An imaging unit comprising:

the optical device according to claim 1; and an imaging device disposed in contact with said second exit surface.

3. An imaging unit according to claim 2, wherein at least a part of surfaces of said first optical member and second optical member is provided with a light-shielding material.

4. An imaging apparatus having a plurality of sets of the imaging units according to claim 2, wherein said plurality of sets of imaging units are arranged such that the respective first entrance surfaces of said imaging units substantially align on an identical plane.

5. A radiation image sensor comprising:

the imaging unit according to claim 2; and a phosphor, disposed on said first entrance surface, for emitting light upon incidence of a radiation.

6. A radiation image sensor according to claim 5, wherein said first entrance surface is ground so as to yield a centerline average roughness within the range of 0.20 to 0.80 μm.

7. A fingerprint identifying apparatus comprising:

an imaging unit for capturing an image of a fingerprint;

a fingerprint identifying section for identifying the fingerprint image captured by said imaging unit with a reference pattern registered beforehand; and a display section for displaying a result of identification obtained by said fingerprint identifying section;

wherein said imaging unit is the imaging unit according to claim 2.

8. An optical device comprising first and second optical members each in the form of a plurality of optical fibers extending parallel to each other in a first direction and assembled into a solid block in a direction orthogonal to said first direction, said first direction defining the optical axis of the respective block and each block having a planar entrance surface and a planar exit surface spaced apart from each other at opposite ends of its optical axis, the planar entrance surface of the first optical member extending at an acute angle relative to the optical axis of the first optical member, the first and second optical members being juxtaposed with the exit surface of the first member contiguous with the entrance surface of the second member so that the optical axes of the two members intersect non-perpendicularly with the acute angle of inclination of the exit surface of the first member with respect to its axis being greater than the acute angle of inclination of the entrance surface of the second member with respect to its axis whereby light entering the first member at its entrance surface will be transmitted efficiently through the first member and into and through the second member, the entrance and exit surfaces of the first member being non-perpendicular with respect to the optical axis of the first member and being inclined in different orthogonal directions with respect to the optical axis of the first member.

* * * * *